United States Patent
So et al.

(10) Patent No.: US 8,549,213 B2
(45) Date of Patent: Oct. 1, 2013

(54) NONVOLATILE STORAGE DEVICE, ACCESS DEVICE AND NONVOLATILE STORAGE SYSTEM

(75) Inventors: Hirokazu So, Kyoto (JP); Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 13/023,017

(22) Filed: Feb. 8, 2011

(65) Prior Publication Data

US 2011/0213915 A1    Sep. 1, 2011

(30) Foreign Application Priority Data

Mar. 1, 2010    (JP) .................................. 2010-043920
Mar. 12, 2010   (JP) .................................. 2010-055736

(51) Int. Cl.
    *G06F 12/00*    (2006.01)
(52) U.S. Cl.
    USPC ..... 711/103; 711/100; 711/154; 711/E12.008

(58) Field of Classification Search
    USPC ........................... 711/100, 103, 154, E12.008
    See application file for complete search history.

(56) References Cited

U.S. PATENT DOCUMENTS

| | | | |
|---|---|---|---|
| 2009/0175592 A1* | 7/2009 | Haraguchi | 386/95 |
| 2010/0228905 A1 | 9/2010 | Honda | |
| 2011/0026318 A1* | 2/2011 | Franceschini et al. | 365/163 |

FOREIGN PATENT DOCUMENTS

| | | |
|---|---|---|
| JP | 11-234613 | 8/1999 |
| WO | 2009/013877 | 1/2009 |

* cited by examiner

*Primary Examiner* — Jasmine Song
(74) *Attorney, Agent, or Firm* — Wenderoth, Lind & Ponack, L.L.P.

(57) ABSTRACT

A nonvolatile storage device includes a nonvolatile memory that stores data and a memory controller that controls the nonvolatile memory. The memory controller accepts a pause instruction to pause writing from the access device within a period in which data from the access device are written, and writes the data received from the access device to the nonvolatile memory within a predetermined time interval, then pauses the writing and accepts read and/or write of new data from the access device.

19 Claims, 29 Drawing Sheets

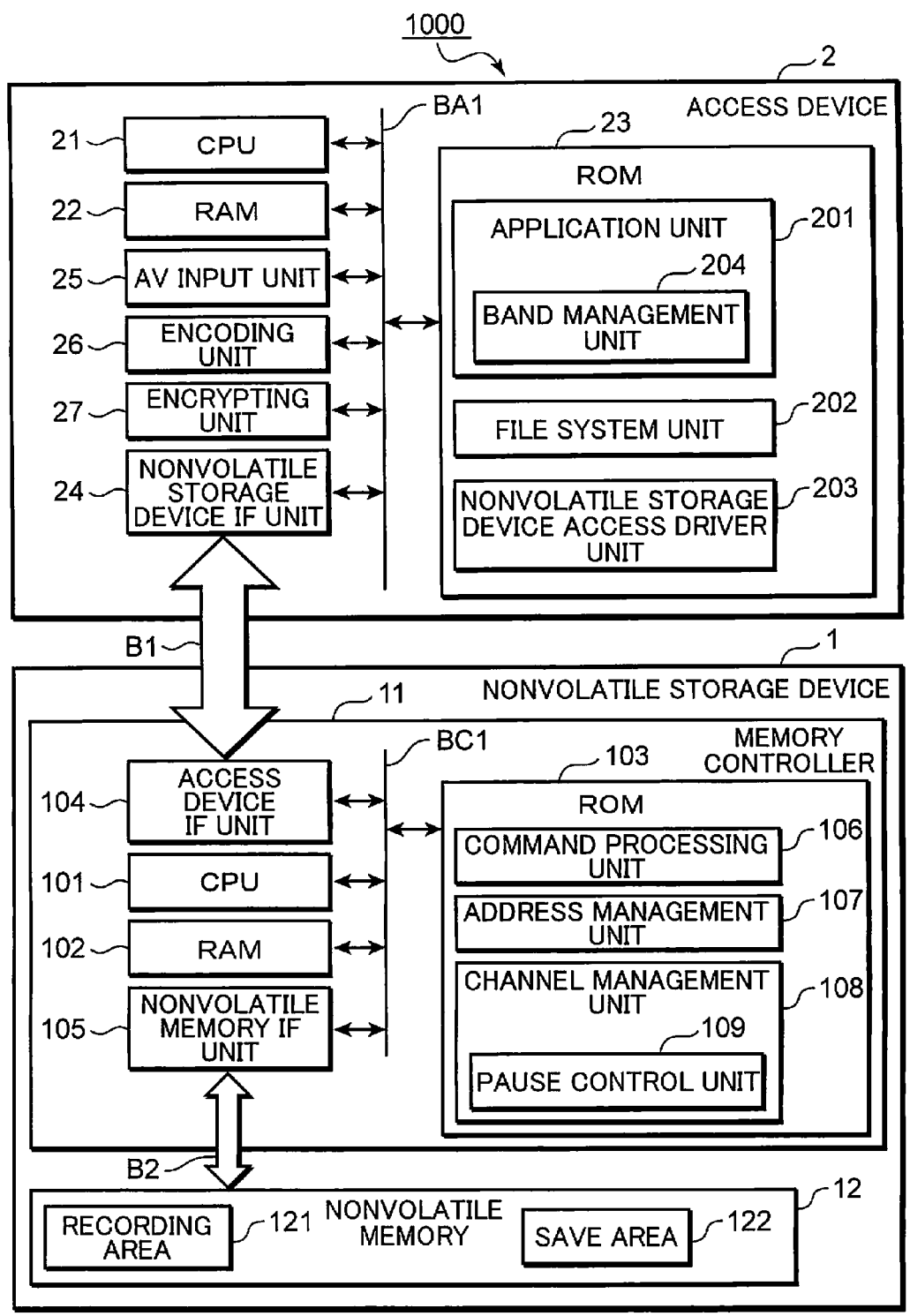

FIG. 2

BAND MANAGEMENT TABLE

| CONTENTS NUMBER | CHANNEL NUMBER | BAND INFORMATION | RECORDING RATE | CONTENTS END FLAG | PAUSE FLAG |
|---|---|---|---|---|---|
| C001 | Ch. 0 | 1sec／3sec | 2MB／sec | ON | ON |
| C002 | Ch. 1 | 2sec／3sec | 4MB／sec | OFF | OFF |
| VOID | Ch. 2 | — | — | OFF | OFF |
| VOID | Ch. 3 | — | — | OFF | OFF |

FIG. 3

PAUSE MANAGEMENT TABLE

| CHANNEL NUMBER | SAVE FLAG | PHYSICAL BLOCK ADDRESS | DELETE COMPLETION FLAG | SAVED DATA ADDRESS | SAVED DATA SIZE |
|---|---|---|---|---|---|
| Ch. 0 | ON | 0x4A00 | OFF | 0x00F200 | 0x02 |
| Ch. 1 | OFF | 0x4A10 | ON | — | — |
| Ch. 2 | OFF | 0x4A20 | ON | — | — |
| Ch. 3 | OFF | 0x4A30 | ON | — | — |

FIG. 18

| ENTRY INFORMATION | WRITE COMPLETION FLAG | | | | | | |
|---|---|---|---|---|---|---|---|
| | RECORD #1 | LSA | | | | | |
| | | ENTRY NUMBER | | | | | |
| | RECORD #2 | LSA | | | | | |
| | | ENTRY NUMBER | | | | | |
| | RECORD #3 | LSA | | | | | |
| | | ENTRY NUMBER | | | | | |
| | RECORD #4 | LSA | | | | | |
| | | ENTRY NUMBER | | | | | |
| | ... | | | | | | |
| CAT | | | | | | | |
| CACHE DATA | | | | | | | |

| ENTRY #1 | ENTRY #2 | ENTRY #3 |
|---|---|---|
| OFF | OFF | OFF |
| INVALID | INVALID | INVALID |
| INVALID | INVALID | INVALID |
| INVALID | INVALID | INVALID |
| INVALID | INVALID | INVALID |
| INVALID | INVALID | INVALID |
| INVALID | INVALID | INVALID |
| INVALID | INVALID | INVALID |
| ... | ... | ... |
| INVALID | INVALID | INVALID |

FIG. 22

| ENTRY INFORMATION | WRITE COMPLETION FLAG | | | | | | | | |
|---|---|---|---|---|---|---|---|---|---|
| | RECORD #1 | LSA | | ENTRY NUMBER | | | | | |
| | RECORD #2 | LSA | | ENTRY NUMBER | | | | | |
| | RECORD #3 | LSA | | ENTRY NUMBER | | | | | |
| | RECORD #4 | LSA | | ENTRY NUMBER | | | | | |
| CAT | | | | | | | | ... | |
| CACHE DATA | | | | | | | | | |

| ENTRY #1 | ON | 32 | 1 | INVALID | INVALID | INVALID | INVALID | INVALID | ... | FOR LSA 32 |
| ENTRY #2 | ON | 32 | 1 | 24 | 2 | INVALID | INVALID | INVALID | ... | FOR LSA 24 |
| ENTRY #3 | ON | 32 | 3 | 24 | 2 | INVALID | INVALID | INVALID | ... | FOR LSA 32 |

UPDATED ENTRY

FIG. 28

| | WRITE COMPLETION FLAG | CONSISTENCY FLAG | |
|---|---|---|---|
| ENTRY #1 | ON | OFF | |
| ENTRY #2 | ON | ON | |
| ENTRY #3 | ON | OFF | |
| ENTRY #4 | ON | OFF | |
| ENTRY #5 | ON | ON | |
| ENTRY #6 | ON | OFF | |
| ENTRY #7 | ON | ON | ← VERY LAST ENTRY |
| ENTRY #8 ~ | OFF | INVALID | |

FIG. 29

| | WRITE COMPLETION FLAG | CONSISTENCY FLAG | |
|---|---|---|---|
| ENTRY #1 | ON | OFF | |
| ENTRY #2 | ON | ON | ← VERY LAST ENTRY |
| ENTRY #3 | ON | OFF | |
| ENTRY #4 | ON | OFF | |
| ENTRY #5 ~ | OFF | INVALID | |

NONVOLATILE STORAGE DEVICE, ACCESS DEVICE AND NONVOLATILE STORAGE SYSTEM

BACKGROUND OF THE INVENTION

1. Field of the Invention

The present invention relates to a nonvolatile storage device such as a semiconductor memory card including a nonvolatile memory and a memory controller controlling the nonvolatile memory, an access device that accesses the nonvolatile storage device, and a nonvolatile storage system using the nonvolatile storage device and the access device.

2. Description of the Related Art

A demand has recently grown for nonvolatile storage devices including a writable nonvolatile memory, primarily for semiconductor memory cards. The semiconductor memory cards are more expensive than optical disks and tape media.

However, the significant merits of semiconductor memory cards include a small size, a light weight, a large capacity, seismic resistance and excellent handleability. For this reason, the demand therefor as recording media for portable devices such as digital still cameras and cellular phones has grown and the semiconductor memory cards has recently also found application as recording media for consumer video recorders and professional video recorders for broadcasting.

Further, slots for semiconductor memory cards have recently become a standard feature of not only portable devices, but also stationary devices such as digital TV sets and DVD recorders, and the demand for semiconductor memory cards has further grown.

The semiconductor memory card includes a flash memory (mainly, of a NAND type) as a nonvolatile main storage memory and has a memory controller that controls the flash memory. The memory controller performs read/write control of data with respect to the flash memory in response to a data read/write command from an access device such as a digital still camera body.

The access device manages the storage area of the semiconductor memory card with a file system such as a FAT (File Allocation Table) file system. By using the file system, the semiconductor memory card can store contents data such as dynamic images, voice, and stationary images as individual files.

The increase in capacity of semiconductor memory cards is expected to result in future increase in the number of systems that write a plurality of files in parallel. For example, in access devices that perform broadcast image recording on a semiconductor memory card, a demand for a function of simultaneous recording of a plurality of programs, as in the recently developed DVD recorders, will apparently increase.

In such systems, on the access device side, data with a logical meaning (for example for each program or each contents data) are written in parallel, but on the semiconductor memory card side, a plurality of files having no logical meaning are written sporadically as a mixture. The resultant problem is that the files cannot be distinguished from each other and the write performance is degraded.

A method by which an access device writes data into a semiconductor memory card by designating a channel number has been suggested as a method for resolving the above-described problem (see, for example, WO 2009/013877).

With this method the semiconductor memory card manages a physical address of a write destination for each channel number. The access device allocates a channel number of each meaningful data (for example, each contents data) and writes the data together with the channel number. In this case, the semiconductor memory card manages a write destination for each meaningful data and therefore the degradation of write performance caused by parallel writing can be prevented.

Generally, when an access device records contents data in a nonvolatile storage device such as a semiconductor memory card, a contents file storing the contents is recorded as the contents data and various kinds of relevant information (for example, a name, a thumbnail image, a time search table, a bit rate, a reproduction time, and encryption information) attached to the contents are also recorded as contents management information files.

Further, various kinds of information attached to the entire contents, including the contents data (for example, a total contents number, a total reproduction time, a play list, and the like) are also recorded as separate contents management information files. In this case, the contents management information files are most often divided into a large number of files for each type of information that will be stored. Therefore, when one contents data is recorded, the contents of a large number of contents management information files should be updated following the recording process.

These contents management information files are used mainly when an access device reproduces the contents data that have been stored in the nonvolatile storage device. The access device looks up the contents management information files recorded in the nonvolatile storage device, retrieves and acquires various kinds of information relating to the desired contents data, and then reproduces the contents data from the contents file. The merit of such a system is that even when the number of contents data has increased to several thousands or several tens of thousands, using the contents management information files makes it possible to manage the contents data easily and perform high-speed retrieval.

However, when the power supply is cut off or the nonvolatile storage device is pulled out before the contents management information files are updated after the contents data have been recorded, the contents management information files are not updated and therefore a state is assumed in which contents data cannot be retrieved and reproduction thereof is impossible. Therefore, it is desirable that the contents management information files be updated as the contents data are recorded.

Further, in a system in which a plurality of contents data are recorded in parallel, even if the recording of a certain contents data is completed, the recording of other contents data can be continued. In such a state it is also desirable that a contents management information file relating to the contents data for which the recording has been completed be updated rapidly.

Accordingly, a method can be considered by which the degradation of write performance caused by parallel writing in a system in which a plurality of contents data are recorded in parallel is prevented by allocating a channel number to each contents file and each contents management information file.

However, where a channel number is allocated to each contents file and each contents management information file, a very large number of channel numbers are required. This results in the following problems:

(1) management of file numbers in the access device and nonvolatile storage device becomes complex, and (2) a physical block of write destination should be ensured for each channel number in the nonvolatile storage device and storage capacity is reduced.

SUMMARY OF THE INVENTION

The present invention has been created with consideration for the above-described problems, and it is an object of the present invention to provide a nonvolatile storage device, an access device, and a nonvolatile storage system that can write a contents file and a plurality of contents management information files in parallel so as to prevent the degradation of write performance, while inhibiting the increase in the channel numbers used.

A nonvolatile storage device according to one aspect of the present invention can communicate with an access device and performs reading and/or writing of data on the basis of an instruction from the access device, the nonvolatile storage device including: a nonvolatile memory that stores data; and a memory controller that controls the nonvolatile memory, wherein the memory controller accepts a pause instruction to pause writing from the access device within a period in which data from the access device are written, and writes the data received from the access device to the nonvolatile memory within a predetermined time interval, then pauses the writing and accepts read and/or write of new data from the access device.

With the above-described configuration, it is possible to provide a nonvolatile storage device, an access device, and a nonvolatile storage system that can write a contents file and a plurality of contents management information files in parallel so as to prevent the degradation of write performance, while inhibiting the increase in the channel numbers used.

These and other objects, features and advantages of the present invention will become more apparent upon reading the following detailed description along with the accompanying drawings.

BRIEF DESCRIPTION OF THE DRAWINGS

FIG. 1 is a block diagram illustrating the configuration of the nonvolatile storage system of Embodiment 1 of the present invention;

FIG. 2 illustrates an example of the band management table used by the access device in Embodiment 1 of the present invention;

FIG. 3 shows an example of the pause management table used by the nonvolatile storage device in Embodiment 1 of the present invention;

FIG. 18 shows an example of MICF state after the MICF creation processing in Embodiment 2 of the present invention;

FIG. 22 illustrates an example of MICF state after the management information write processing has been performed three times after the MICF creation processing in Embodiment 2 of the present invention;

FIG. 28 illustrates Example 1 of MICF write state in Variation Example 2 of Embodiment 2 of the present invention;

FIG. 29 illustrates Example 2 of MICF write state in Variation Example 2 of Embodiment 2 of the present invention;

DESCRIPTION OF THE PREFERRED EMBODIMENTS

Figure 4:
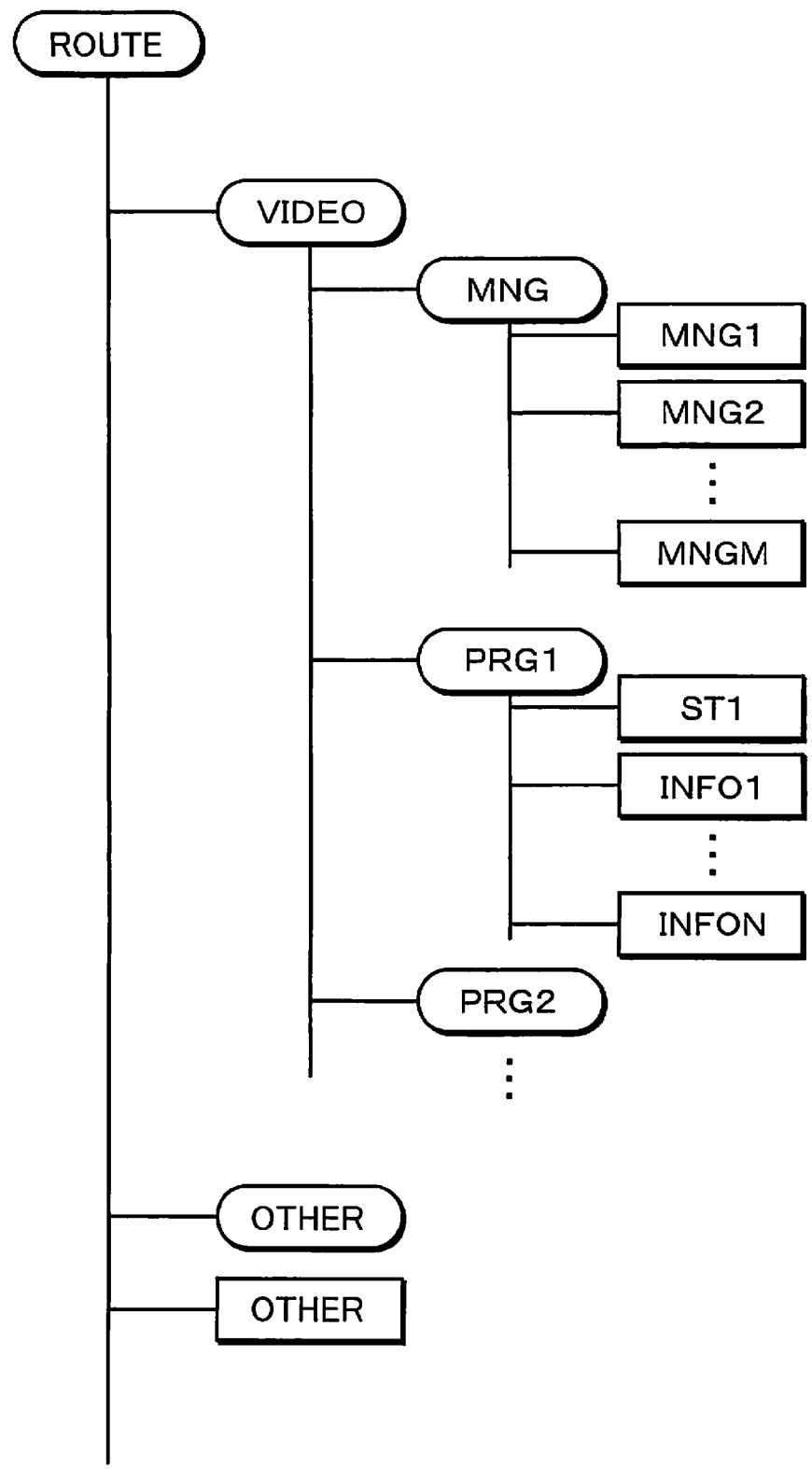
FIG. 4 is an explanatory drawing illustrating an example of directory and file configuration when the application unit of the access device in Embodiment 1 of the present invention stores contents data in the nonvolatile storage device.

In the following, the embodiments of the invention is described referring to the drawings.

Embodiment 1

<1.1. Configuration of Nonvolatile Storage System>

FIG. 1 is a block diagram illustrating the configuration of a nonvolatile storage system 1000 of Embodiment 1 of the present invention. As shown in FIG. 1, the nonvolatile storage system 1000 includes a nonvolatile storage device 1 and an access device 2 having the nonvolatile storage device 1 mounted thereon. The nonvolatile storage device 1 and the access device 2 are connected by a bus B1 and communication therebetween can be conducted in both directions. The nonvolatile storage device 1 reads and/or writes data in response to an instruction from the access device 2. The nonvolatile storage device 1 is for example, a semiconductor memory card. The access device 2 is for example a video recorder that records video contents to the semiconductor memory card.

(1.1.1. Configuration of the Access Device)

As shown in FIG. 1, the access device 2 includes a CPU (Central Processing Unit) 21, a RAM (Random Access Memory) 22, a ROM (Read-Only Memory) 23, a nonvolatile storage device interface (IF) unit 24, an AV (Audio Visual) input unit 25, an encoding unit 26, and an encrypting unit 27. The functional units of the access device 2 are connected by a bus BA1, as shown in FIG. 1. The access device 2 may be configured so that some or all of the functional units of the access device 2 are directly connected.

The CPU 21 performs various types of control of the access device 2 by using the RAM 22 and the ROM 23.

The RAM 22 can execute the read/write processing of various types of data with respect to a predetermined address. The data stored in the RAM 22 can be accessed from the CPU 21 or each functional unit of the access device 2.

The ROM 23 stores a program that controls the access device 2. This program is loaded into the RAM 22 and executed by the CPU 21.

The nonvolatile storage device IF unit 24 is a unit connecting the nonvolatile storage device 1 and the access device 2. The control signals and data are transmitted between the access device 2 and the nonvolatile storage device 1 via the nonvolatile storage device IF unit 24.

The AV input unit 25 receives AV input data (video images, voice data, and control data related thereto) such as broadcasting waves from the outside. The AV input data received by the AV input unit 25 are subjected to processing according to the program stored in the ROM 23, encoding with the encoding unit 26, or encrypting with the encrypting unit 27, and the contents data are stored as a contents file and contents management information files in the nonvolatile storage device 1.

The contents data as referred to herein are data that are divided into a contents file that stores the contents and a plurality of contents management information files that store related information (for example, a name, a thumbnail image, a time search table, a bit rate, a reproduction time, encryption information, and the like) attached to the contents. The divided contents data are stored in the nonvolatile storage device 1.

The encoding unit 26 performs encoding, with a predetermined encoding system, of the AV input data received by the AV input unit 25.

The encrypting unit 27 performs encryption, with a predetermined encryption system, of the AV input data (for example, AV input data that are instructed to be encrypted) received by the AV input unit 25 or the AV input data encoded with the encoding unit 26.

As shown in FIG. 1, the ROM 23 includes an application unit 201, a file system unit 202, and a nonvolatile storage device access driver unit 203. In the present embodiment, the application unit 201, file system unit 202, and nonvolatile storage device access driver unit 203 are assumed to be realized with software on the ROM 23, but such a configuration is not limiting. For example, some or all of the application unit 201, file system unit 202, and nonvolatile storage device access driver unit 203 can be realized with hardware.

The application unit 201 controls the entire access device 2 by controlling data generation or power source. The application unit 201 of the present embodiment also includes a band management unit 204. The band management unit 204 allocates an access time to the nonvolatile storage device 1 in predetermined unit time intervals for each contents data when a plurality of contents data are written to the nonvolatile storage device 1 by time division multiplexing.

More specifically, when a plurality of contents file and contents management information file are written in parallel to the nonvolatile storage device 1 by time division multiplexing, the band storage unit 204 manages the access time to the nonvolatile storage device 1 as a band allowed for each writing. The band management unit 204 generates a band management table in the RAM 22 and uses the table to perform band management.

FIG. 2 illustrates an example of the band management table stored in the RAM 22. The band management table is based on the assumption that a maximum of four AV input data are written in parallel into the nonvolatile storage device 1. The band management table stores information of the following six types for each AV input data.

"CONTENTS NUMBER" identifying the AV input data.

"CHANNEL NUMBER" that is used when the contents file and contents management information file relating to the AV input data are written to the nonvolatile storage device 1.

"BAND INFORMATION" that is presently allocated to write the AV input data.

"RECORDING RATE" of the AV input data.

"CONTENTS END FLAG" indicating whether or not the input (writing) of the contents file of the AV input data has been completed.

"PAUSE FLAG" indicating whether or not a channel pause command (described hereinbelow) has been issued during writing of the contents management information file of the AV input data.

In the example shown in FIG. 2, when the contents file and contents management information file of the AV input data (contents data) with the contents number equal to C001 (contents number=C001) and the contents file and contents management information file of the AV input data (contents data) with the contents number equal to C002 (contents number=C002) are written in parallel by time division multiplexing, in the time-divided initial period, the C001 contents file and contents management information file are written using the channel number 0 (Ch. 0).

In this case, 1 sec/3 sec is set as the band information (ratio of the access time allowed for writing the data to the predetermined unit time), and the recording rate in this case is 2 MB/sec. Further, since the contents end flag is ON, the input of these contents data has been completed, and since the pause flag is ON, the channel pause command has been issued during writing of the contents management information file of the contents data.

Further, in the remaining time-divided period, the contents file and contents management information file with the contents number=C002 are written using the channel number 1 (Ch. 1).

In this case, 2 sec/3 sec is set as the band information, and the recording rate is 4 MB/sec. Further, since the contents end flag is OFF, the input of these contents data has not been completed, and since the pause flag is OFF, the channel pause command has not been issued during writing of the contents management information file of the contents data.

As described hereinabove, in the present embodiment, when a plurality of data are written in parallel by time division multiplexing by using a plurality of channels, a ratio of the access time allowed for writing the data to the predetermined unit time is set as band information for each channel, and the data are written successively and a plurality of data are pseudo-written in parallel, while switching the data for each set access time.

Again referring to FIG. 1, the file system unit 202 performs control for managing data as files with a file system such as a FAT file system.

The nonvolatile storage device access driver unit 203 controls transmission and reception of commands and data to and from the nonvolatile storage device 1, for example, transfers data together with the data size and address from the file system unit 202 and records data of the designated size at the designated position in the storage area of the nonvolatile storage device 1.

Further, the application unit 201, file system unit 202, and nonvolatile storage device access driver unit 203 function as a writing unit and perform writing of the contents file and writing of the contents management information files within a range of the access time allocated by the band management unit 204. In this case, the application unit 201 and the file system unit 202 correspond to an example of a writing unit, and the band management unit 204 corresponds to an example of an allocation unit.

(1.1.2. Configuration of Nonvolatile Storage Device)

As shown in FIG. 1, the nonvolatile storage device 1 includes a memory controller 11 and a nonvolatile memory 12 that stores data. The memory controller 11 and the nonvolatile memory 12 are connected to one another by a bus B2. The memory controller 11 performs data exchange (data read/write, command transmission, response reception, etc.) with the nonvolatile memory 12 via the bus B2 and can control the nonvolatile memory 12.

The memory controller 11 is a module that performs the entire control of the nonvolatile storage device 1 and is configured, for example, by LSI (Large Scale Integration) including a CPU or the like. The nonvolatile memory 12 is configured, for example, by at least one NAND flash memory.

As shown in FIG. 1, the memory controller 11 includes a CPU 101, a RAM 102, a ROM 103, an access device interface (IF) unit 104, and a nonvolatile memory interface (IF) unit 105. The functional units of the memory controller 11 are connected with one another via a bus BC1, as shown in FIG. 1. The memory controller 11 may also have a configuration in which some or all of the functional units of the memory controller 11 are directly connected to one another.

The memory controller 11 accepts a channel pause command (pause instruction) to pause writing from the access device 2 within the period in which data from the access device 2 are written, writes the data received from the access device 2 to the nonvolatile memory 12 within a predetermined time interval, then pauses the writing, and accepts read and/or write of new data from the access device 2.

The access device IF unit 104 is a unit connecting the nonvolatile storage device 1 with the access device 2. Control signals and data are exchanged between the access device 2 and the nonvolatile storage device 1 via the access device IF unit 104 in the same manner as via the nonvolatile storage device IF unit 24.

The nonvolatile memory IF unit 105 is a unit connecting the memory controller 11 with the nonvolatile memory 12. Commands or data for the nonvolatile memory 12 are exchanged between the memory controller 11 and the nonvolatile memory 12 via the nonvolatile memory IF unit 105.

The ROM 103 stores a program that controls the nonvolatile storage device 1. This program is loaded into the RAM 102 and executed by the CPU 101.

More specifically as shown in FIG. 1, the ROM 103 includes a command processing unit 106, an address management unit 107, and a channel management unit 108. In the present embodiment, the command processing unit 106, address management unit 107, and channel management unit 108 are assumed to be executed with software on the ROM 103, but such a configuration is not limiting. For example, some or all of the command processing unit 106, address management unit 107, and channel management unit 108 can be realized with hardware.

The command processing unit 106 is a functional unit that interprets the command and parameters relating to the command received from the access device 2 via the access device IF unit 104 and executes the processing of the command.

The address management unit 107 performs the entire address management of the nonvolatile memory 12. The address management unit 107 manages the association of a logical address in a logical address space provided by the nonvolatile storage device 1 as an address space accessible from the access device 2 and a physical address of the nonvolatile memory 12. The address management unit 107 also manages a physical address of a free block, which is a block that stores no valid data and can be reused for data writing, a physical adders of a bad block that cannot be used for data writing, and a physical address of a block that stores a conversion table for logical addresses and physical addresses.

The channel management unit 108 allocates physical blocks of write destination for each channel number designated by the access device 2 during data writing and manages the write state. As a result, the degradation of write performance is prevented even when the access device 2 performs parallel writing of different channel numbers.

The channel management unit 108 in the present embodiment is provided with a pause control unit 109. The pause control unit 109 performs a processing for emergency pausing the writing with the designated channel number and a processing for recovery from the pause state. In order to preform such pause-recovery processing, the pause control unit 109 creates a pause management table in the RAM 102 and uses the table.

The nonvolatile memory 12 includes a save area 122 that is used by the pause control unit 109 in the present embodiment as a save destination for write data, and a record area 121 that is a section for storing other data written from the access device 2 or system information that is used internally by the nonvolatile storage device 1. When a write command (write instruction) for writing the data is accepted from the access device 2, the pause control unit 109 of the memory controller 11 ensures part of the nonvolatile memory 12 as the save area 122 and deletes in advance the physical block constituting the save area 122 before the writing is performed.

FIG. 3 shows an example of the pause management table stored in the RAM 102. The pause management table is based on the assumption that the nonvolatile storage device 1 manages a maximum of four channels. The pause management table stores the following six items of information.

"SAVE FLAG" indicating whether or not the write data in the channel number have been saved in the save area 122.

"PHYSICAL BLOCK ADDRESS" indicating a physical location of the save area 122 allocated to the channel number.

"DELETE COMPLETION FLAG" indicating whether or not the physical block has been deleted.

"SAVED DATA ADDRESS" indicating the logical address of the saved write data when the save flag is ON.

"SAVED DATA SIZE" indicating the size of the saved write data when the save flag is ON.

In the example shown in FIG. 3, when the channel number is 0 (Ch. 0), the save flag is ON and therefore the write data with the allocated channel number 0 are saved in the save area 122, the address of the physical block of the save area 122 is 0x4A00, the logical address of the saved write data is 0x00F200, and the size of the write data is 0x02. Further, since the delete completion flag is OFF, the data in the physical block of the save area 122 are not deleted.

When, the channel number is 1 (Ch. 1), the save flag is OFF and therefore the write data with the allocated channels number 1 are not saved in the save area 122, the physical block address of the save area 122 is 0x4A10. Further, since the delete completion flag is ON, the data in the physical block of the save area 122 have been deleted.

(1.1.3. Directory and File Configuration)

In the access device 2, the management of the recording area of data provided by the nonvolatile storage device 1 is performed by the file system. In the present embodiment, the FAT file system (FAT12, FAT16, FAT32, exFAT, etc.) that has been generally used in the semiconductor memory card is used, but another file system such as an independent file system or an UDF (User Datagram Protocol) may be also used.

FIG. 4 illustrates an example of directory and file configuration when the application unit 201 of the access device 2 stores (records) the AV contents in the nonvolatile storage device 1.

In the present embodiment, a "VIDEO" directory is created immediately below the route directory, and "PRG1" and "PRG2" directories that store individual AV contents are created immediately below the "VIDEO" directory. Further, a "ST1" file of a contents file that is a video-audio stream data body and N files "INFO1", "INFO2", . . . , "INFON", which are contents management information files where metadata of the contents file have been saved, are created in the "PRG1". A group of files similar to that created in the "PRG1" is also created in the "PRG2" directory.

Further, a directory "MNG" storing metadata (for example, the total number of AV contents data, total reproduction time, play list, etc.) relating to all of the AV contents data is created immediately below the "VIDEO" directory. A total of M files, namely, "MNG1", "MNG2", . . . , "MNGM" files, which are contents management information files, are created immediately below the "MNG" directory.

Therefore, when the access device 2 records one AV contents, a plurality of contents management information files (for example, files corresponding to the abovementioned "INFO1" and "MNG1") should be written in addition to the contents files. Data of different files are typically stored at different logical addresses. Therefore, when such a plurality of contents management information files are updated, data of small size are written to a plurality of random logical addresses that are not consecutive.

Such random writing generally degrades the write performance. Where writing is performed by allocating a channel number of each contents management information file as a countermeasure, a large number of channel numbers are required and the aforementioned problem is encountered. Accordingly, in the present embodiment, an adequate band control is performed by the below-described processing so that the real time recording does not fail even when such random writing is performed during the real time recording of the AV contents.

<1.2. Operation of Nonvolatile Storage System>

The operation of the nonvolatile storage system 1000 will be described below. The nonvolatile storage device 1 is mounted on the access device 2, and processing corresponding to the command issued by the access device 2 is implemented. The access device 2 issues to the nonvolatile storage device 1 a command necessary for storing the AV contents in the nonvolatile storage device 1.

(1.2.1. Operation of Nonvolatile Storage Device)

First, the operation of the nonvolatile storage device 1 will be explained.

<<Channel Pause Command Processing>>

Figure 5:
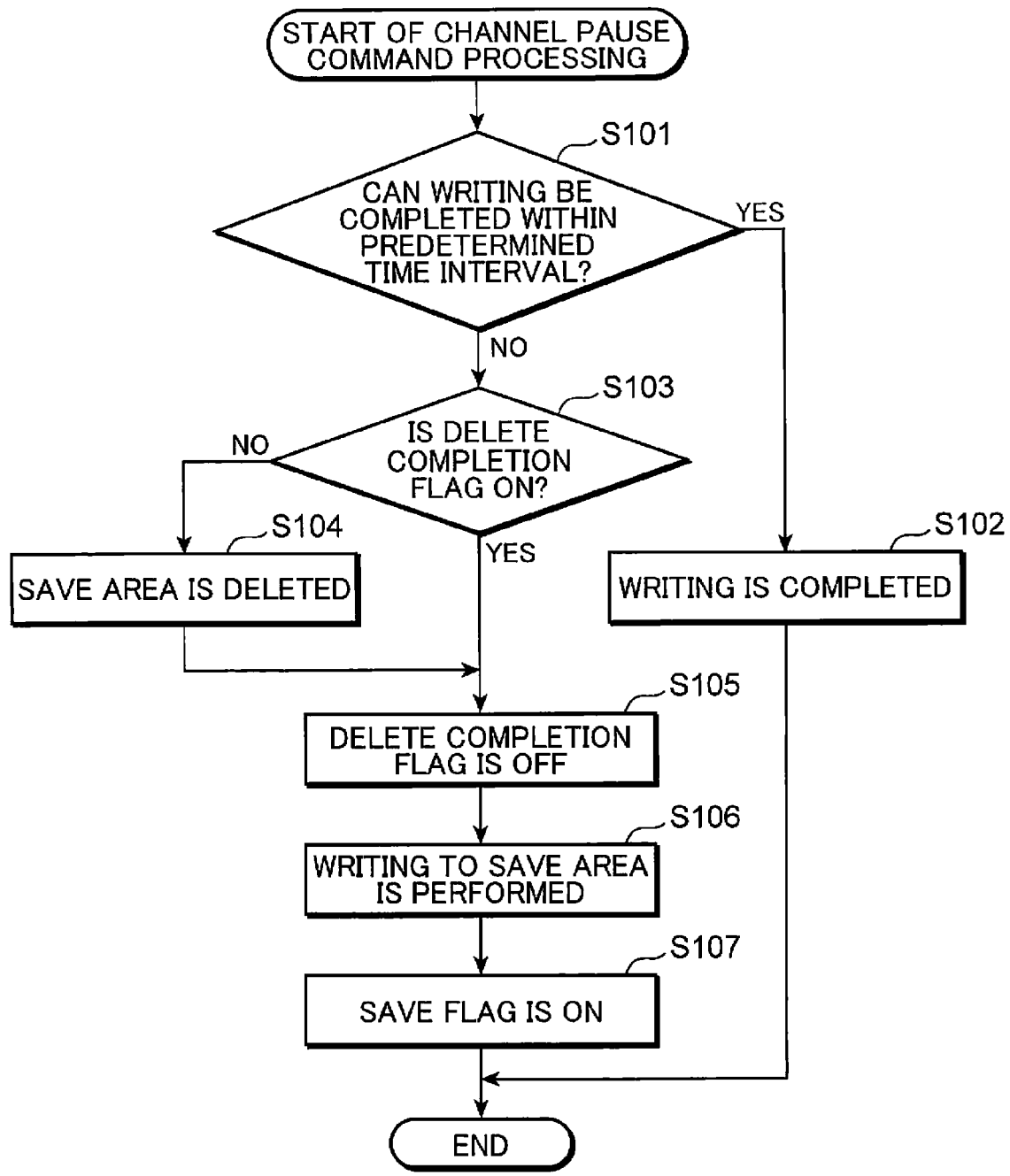
FIG. 5 is a flowchart illustrating a procedure of channel pause command processing in the nonvolatile storage device in Embodiment 1 of the present invention.

FIG. 5 is a flowchart illustrating a procedure of channel pause command processing in the nonvolatile storage device 1. A channel pause command is issued by the access device 2 to pause temporarily the write command processing in the case of a comparatively long processing time, for example, when the immediately preceding write command corresponds to a random address.

First, the processing performed in step S101 will be explained. Where the command processing unit 106 receives a channel pause command from the access device 2 via the access device IF unit 104, the write state of data that have been received by the immediately preceding write command is confirmed. In this case, if necessary, the command processing unit 106 looks up the information of the channel management unit 108 or address management unit 107. Where the write state indicates that the writing (1) has already been completed or (2) is estimated to be completed within a comparatively short predetermined time interval T, the processing advances to step S102. Where the writing (3) is estimated not to be completed within the aforementioned predetermined time interval T, the processing advances to step S103.

The processing performed in step S102 will be explained below. The command processing unit 106 completes (within the predetermined time interval T) the writing of data received according to the immediately preceding write command and ends the processing.

The processing performed in step S103 will be explained below. When the command processing unit 106 determines that the writing of data received according to the immediately preceding write command has not been completed within the predetermined time interval T, the pause control unit 109 looks up the pause management table stored in the RAM 102 and confirms the "DELETE COMPLETION FLAG" with the channel number designated from the access device 2 by the immediately preceding write command. When the delete completion flag is ON, the processing advances to step S105, and when the delete completion flag is OFF, the processing advances to step S104.

The processing performed in step S104 will be explained below. The pause control unit 109 looks up the pause management table, looks up the address of the physical block for which the "DELETE COMPLETION FLAG" is OFF, physically deletes the physical block via the nonvolatile memory IF unit 105, and sets the "DELETE COMPLETION FLAG" ON.

In the present embodiment, the delete completion flag can be OFF only in the abnormal system state, for example, when power supply to the access device 2 is cut off during data recording or the nonvolatile storage device 1 is pulled out. In such cases, the processing of step S104 is executed.

The processing performed in step S105 will be explained below. The pause control unit 109 updates from ON to OFF the "DELETE COMPLETION FLAG" of the channel number designated from the access device 2 by the immediately preceding write command in the pause management table.

The processing performed in step S106 will be explained below. The pause control unit 109 writes to the save area 122 those of the data received according to the immediately preceding write command that have not yet been written to the recording area 121. Then, the pause control unit 109 updates the "SAVED DATA ADDRESS" and "SAVED DATA SIZE" of the pause management table in response to writing to the save area 122.

The processing performed in step S107 will be explained below. The pause control unit 109 updates from OFF to ON the "SAVE FLAG" of the channel number designated from the access device 2 by the immediately preceding write command in the pause management table.

The aforementioned predetermined time interval T is desirably determined with consideration for the time required for processing of steps S103 to S107. The processing of steps S103 to S107 is a processing performed to stop temporarily the processing of the immediately preceding write command because "the time interval is insufficient", and where the processing time of step S102 in which the writing is completed is shorter than the time required for the processing of the aforementioned steps, completing the writing without a pause would be more efficient.

For example, a time interval (equal to or less than 20 ms) required for several page writing of a physical page, which is a write unit of a NAND flash constituting the nonvolatile memory 12, may be set as a specific value of the predetermined time interval T.

<<Channel Recover Command Processing>>

Figure 6:
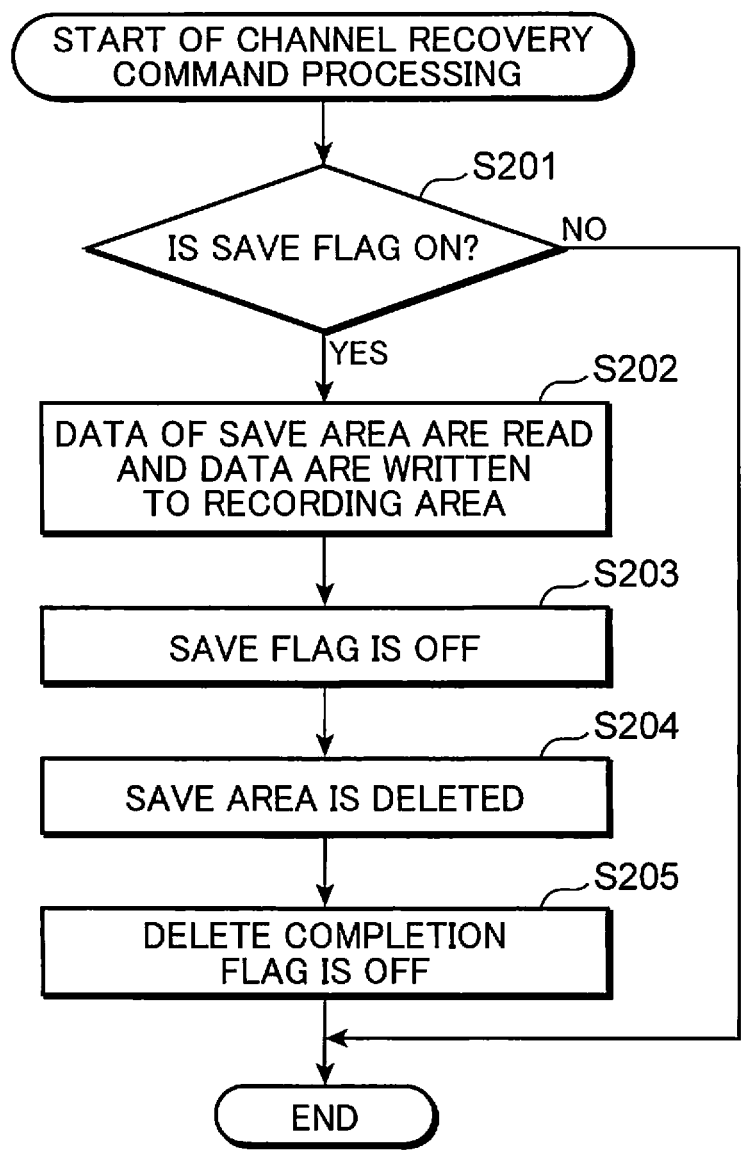
FIG. 6 is a flowchart illustrating a procedure of channel recovery command processing in the nonvolatile storage device in Embodiment 1 of the present invention.

FIG. 6 is a flowchart illustrating a procedure of channel recovery command processing in the nonvolatile storage device 1. The channel recovery command is issued by the access device 2 for restarting the processing that has been temporarily stopped by the channel pause command.

First, the processing performed in step S201 will be explained. Where the command processing unit 106 receives a channel recovery command from the access device 2 via the access device IF unit 104, the command processing unit 106 notifies the pause control unit 109 of the channel recovery command. The pause control unit 109 looks up the pause management table and looks up a save flag of the channel number designated by the channel recovery command. When the save flag is ON, the processing advances to step S202, and when the save flag is OFF, no processing is performed.

The processing performed in step S202 will be explained below. The pause control unit 109 accepts the channel pause command (pause instruction) within the period in which data from the access device 2 are written, temporarily stops the writing, and where a channel recovery command (recovery instruction) is thereafter accepted to recover from the pause according to the instruction from the access deice 2, the pause control unit 109 looks up the pause management table, reads the data stored in the save area 122, and writes the data to the recording area 121. In this case, the "PHYSICAL BLOCK ADDRESS" of the pause management table is used as a physical location of data of the read source (save area 122). The "SAVED DATA ADDRESS" and "SAVED DATA SIZE" of the pause management table are used to determine the write destination (recording area 121).

The processing performed in step S203 will be explained below. The pause control unit 109 updates from ON to OFF the save flag of the channel number designated by the channel recovery command.

The processing performed in step S204 will be explained below. The pause control unit 109 physically deletes the physical block of the save area 122 that is associated with the channel number designated by the channel recovery command.

The processing performed in step S205 will be explained below. The pause control unit 109 updates from OFF to ON the delete completion flag of the channel number designated by the channel recovery command and ends the processing.

In steps S204 and S205, the physical block of the save area 122 is physically deleted and the delete completion flag is updated from OFF to ON, thereby making it possible to omit the step S104 of the channel pause command processing and make a rapid transition to the pause state.

<<Channel State Acquisition Command Processing>>

Figure 7:
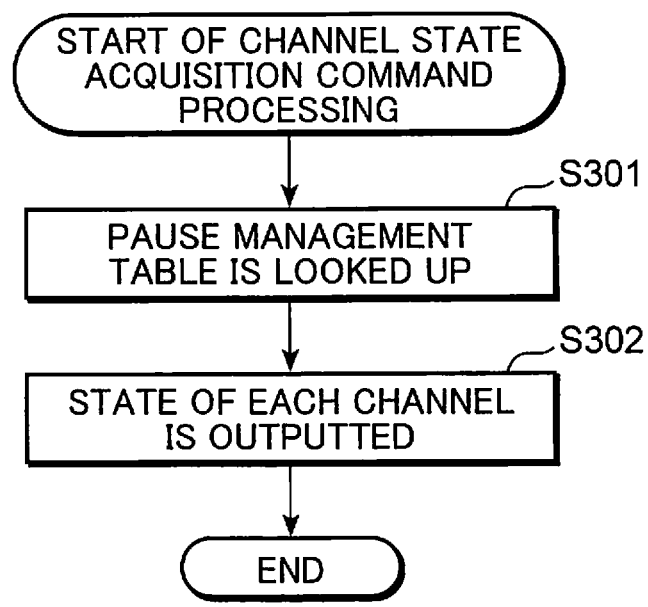
FIG. 7 is a flowchart illustrating a procedure of channel state acquisition command processing in the nonvolatile storage device in Embodiment 1 of the present invention.

FIG. 7 is a flowchart illustrating a procedure of channel state acquisition command processing in the nonvolatile storage device 1. The channel state acquisition command is issued by the access device 2 to confirm the state of each channel immediately after the nonvolatile storage device 1 has been mounted on the access device 2.

First, the processing performed in step S301 will be explained. Where the command processing unit 106 receives a channel state acquisition command from the access device 2 via the access device IF unit 104, the command processing unit 106 notifies the pause control unit 109 of the channel state acquisition command. The pause control unit 109 looks up the pause management table, and generates information for outputting to the access device 2, that is, information to be used by the access device 2 to determine whether a channel pause command (pause instruction) has been accepted within the period in which data from the access device 2 are written and the writing has been paused. For example, the pause control unit 109 generates a determination result of a pause state for each channel number. Thus, the determination results are generated such that the pause state is determined to be assumed if the save flag is ON and not assumed if the save flag is OFF.

The processing performed in step S302 will be explained below. The pause control device 109 outputs the information generated in step S301 to the access device 2 via the access device IF unit 104 and ends the processing.

<<Read Command Processing>>

Figure 8:
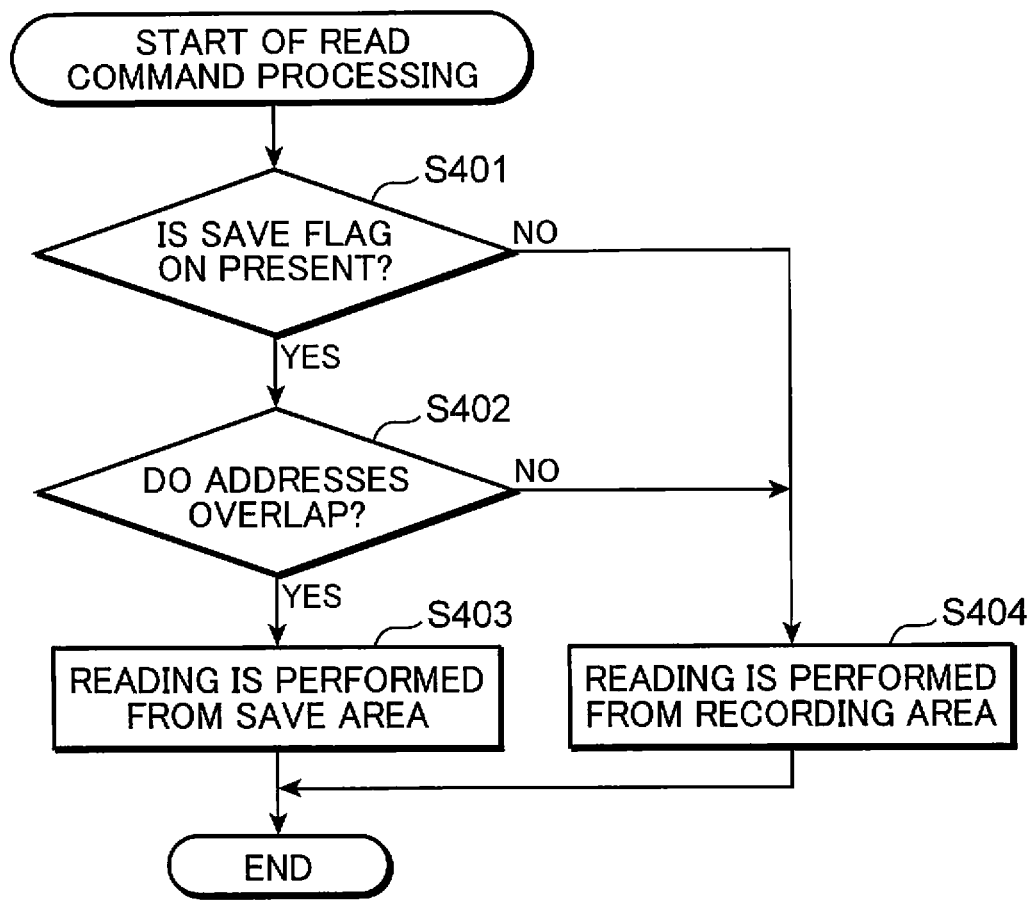
FIG. 8 is a flowchart illustrating a procedure of read command processing in the nonvolatile storage device in Embodiment 1 of the present invention.

FIG. 8 is a flowchart illustrating a procedure of read command processing in the nonvolatile storage device 1. As a basic rule of reading, the nonvolatile storage device 1 preferentially reads data of the save area 122. This is because in the present embodiment, the data present in the safe area 122 are newer at all times than the data present in the recording area 121.

First, the processing performed in step S401 will be explained. Where the command processing unit 106 receives a read command from the access device 2 via the access device IF unit 104, the command processing unit 106 notifies the pause control unit 109 of the read command. The pause control unit 109 looks up the pause management table and determines for all of the channel numbers whether or not at least one save flag ON is present. Where such save flag is present, the processing advances to step S402, and where such save flag is not present, the processing advances to step S404.

The processing performed in step S402 will be explained below. The pause control unit 109 looks up the pause management table and determines whether or not the read address designated by the access device 2 overlaps the address of data stored in the save area 122. The "SAVED DATA ADDRESS" and "SAVED DATA SIZE" are used for such determination. When the addresses overlap, the processing advances to step S403, and when the addresses do not overlap, the processing advances to step S404.

The processing performed in step S403 will be explained below. In this case, the newest data with the read address designated by the access device 2 are present in the save area 122. Therefore, the pause control unit 109 looks up the pause management table, reads the data with the address designated by the access device 2 from the save area 122, outputs the data to the access device 2 via the access device IF unit 104, and ends the processing.

The processing performed in step S404 will be explained below. In this case, the newest data with the read address designated by the access device 2 are present in the recording area 121. Therefore, the address management unit 107 reads the data with the address designated by the access device 2 from the recording area 121, outputs the data to the access device 2 via the access device IF unit 104, and ends the processing.

<<Write Command Processing>>

Figure 9:
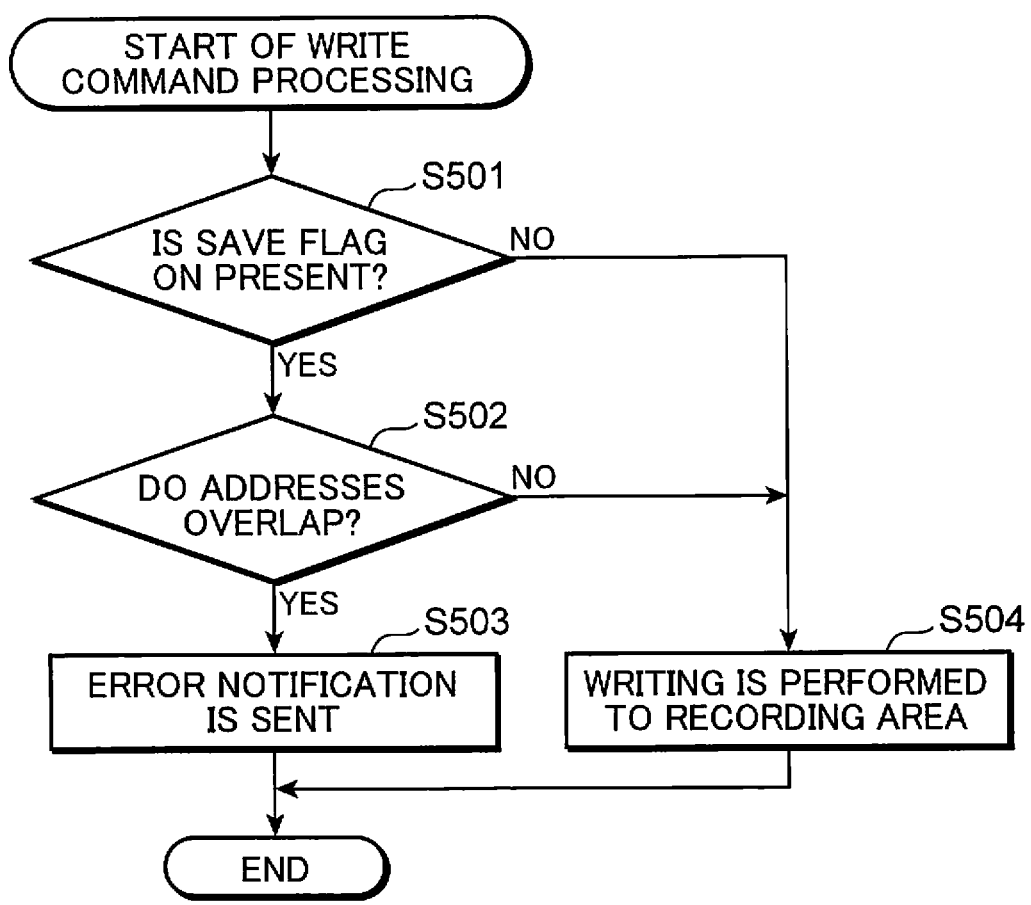
FIG. 9 is a flowchart illustrating a procedure of write command processing in the nonvolatile storage device 1 in Embodiment 1 of the present invention.

FIG. 9 is a flowchart illustrating a procedure of write command processing in the nonvolatile storage device 1. In the present embodiment, writing of data present in the save area 122 and data with overlapping addresses is prohibited to simplify the processing. When the addresses overlap, the data of the save area 122 are reflected in the recording area 121 by a channel recovery command, then the data of the save area 122 are deleted, and a write command is thereafter issued anew.

First, the processing performed in step S501 will be explained. Where the command processing unit 106 receives a write command (write instruction) from the access device 2 via the access device IF unit 104, the command processing unit 106 notifies the pause control unit 109 of the write command. Where the pause control unit 109 accepts the write command received from the access device 2 from the command processing unit 106, the pause control unit 109 ensures part of the nonvolatile memory 12 as the save area 122 and deletes in advance a physical block constituting the save area 122 before the writing is performed. Further, the pause control unit 109 looks up the pause management table and determines for all of the channel numbers whether or not at least one save flag ON is present. Where such save flag is present, the processing advances to step S502, and where such save flag is not present, the processing advances to step S504.

The processing performed in step S502 will be explained below. The pause control unit 109 looks up the pause management table and determines whether or not the write address designated by the access device 2 overlaps the address of data stored in the save area 122. The "SAVED DATA ADDRESS" and "SAVED DATA SIZE" are used for such determination. When a plurality of save flags are ON in the processing of step S501, the pause control unit 109 performs the abovementioned determination with respect to the entire safe area 122. When any address overlaps, the processing advances to step S503, and when no addresses overlap, the processing advances to step S504.

The processing performed in step S503 will be explained below. In this case, the data with the write address designated by the access device 2 are present in the save area 122. Therefore, the pause control unit 109 sends an error message to the access device 2 via the access device IF unit 104 and ends the processing.

The processing performed in step S504 will be explained below. In this case, the write address designated by the access device 2 is not present in the safe area 122. Therefore, the command processing unit 106 determines that the write processing can be continued and writes the write data received from the access device 2 to the recording area 121 via the nonvolatile memory IF unit 105. In this case, the command processing unit 106 looks up the information of the channel management unit 108 or address management unit 107 as necessary. The processing is ended after the completion of writing.

(1.2.2. Operation of Access Device)

The operation of the access device 2 will be explained below.

Figure 10:
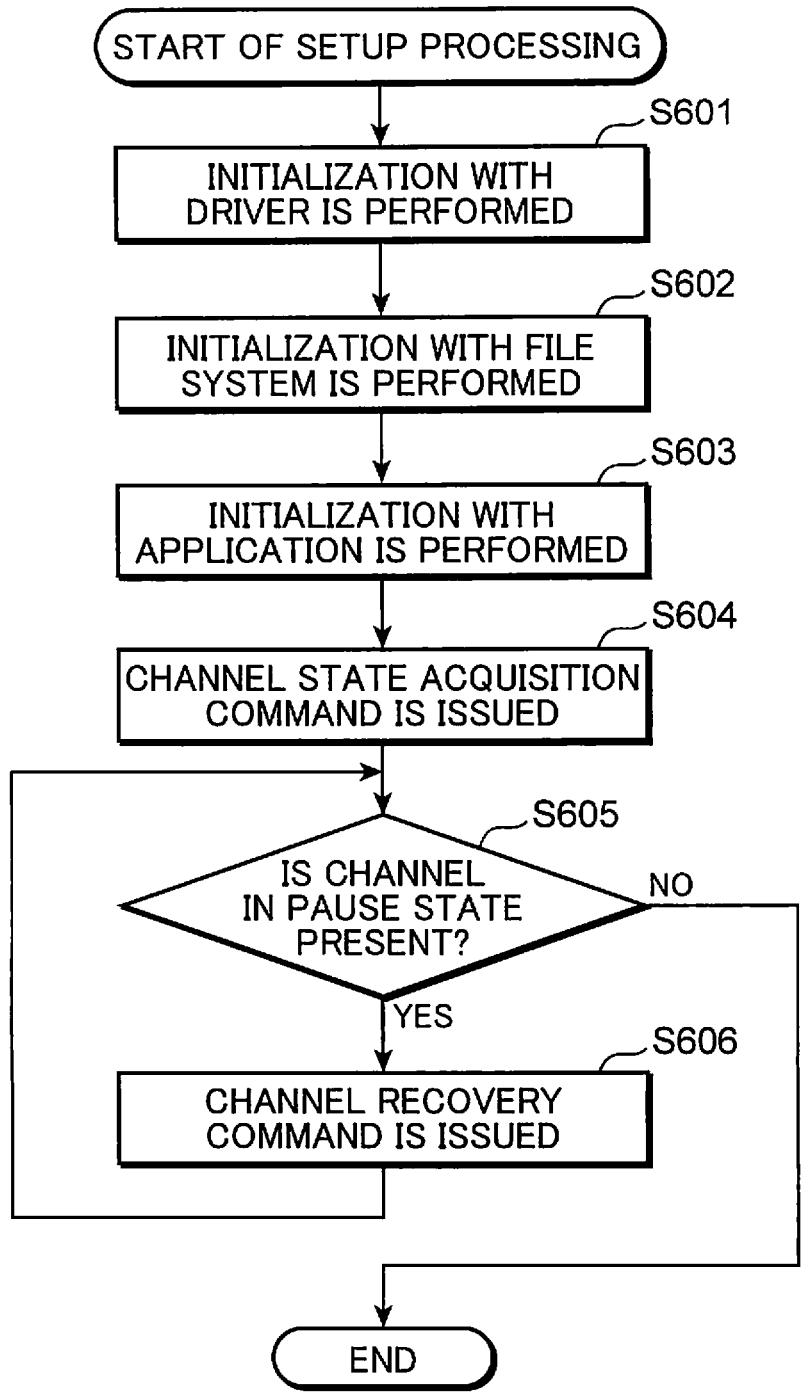
FIG. 10 is a flowchart illustrating a procedure of setup processing in the access device in Embodiment 1 of the present invention.

<<Setup Processing>>

Where the nonvolatile storage device 1 is mounted on the access device 2, the access device 2 starts a setup processing for implementing the recording processing and reproduction processing to and from the nonvolatile storage device 1. FIG. 10 is a flowchart illustrating a procedure of setup processing in the present embodiment.

First, the processing performed in step S601 will be explained. The nonvolatile storage device IF unit 24 of the access device 2 detects that the nonvolatile storage device 1 has been mounted and notifies the nonvolatile storage device access driver unit 203 of the detection result.

In this case, the nonvolatile storage device access driver unit 203 performs the initialization processing at a driver level with respect to the nonvolatile storage device 1. More specifically, the nonvolatile storage device access driver unit 203 starts the supply of power source (electric power) or clock via the nonvolatile storage device IF unit 24 and issues a command to perform initialization. Further, the nonvolatile storage device access driver unit 203 acquires information relating to the nonvolatile storage device 1 (for example, storage capacity or correspondence version number) from the nonvolatile storage device 1 and notifies the file system unit 202 of this information.

The processing performed in step S602 will be explained below. The file system unit 202 reads the file system management information (master boot record, partition table, etc.) stored in the recording area 121 provided by the nonvolatile storage device 1 and acquires on the RAM 22 the information necessary for the file system unit 202 to manage the recording area 121. Thus, the initialization processing at the file system level is performed.

The processing performed in step S603 will be explained below. The application unit 201 reads the contents management information file stored in the nonvolatile storage device 1 via the file system unit 202 and acquires on the RAM 22 the information necessary for the application unit 201. Thus, the initialization processing at the application level is performed.

The processing performed in step S604 will be explained below. The application unit 201 instructs the band management unit 204 to perform the initialization processing. The band management unit 204 issues a channel state acquisition command to the nonvolatile storage device 1 via the nonvolatile storage device IF unit 24 and acquires the determination results of the pause state for each channel number from the pause control unit 109.

The processing performed in step S605 will be explained below. The band management unit 204 determines whether at least one channel with a pause state is present from the determination result of the pause state for each channel number. When at least one channel in the pause state is present (the case of YES), the processing advances to step S606, and when there is no channel in the pause state (the case of NO), the processing is ended.

The processing performed in step S606 will be explained below. The band management unit 204 designates a channel number in the pause state, issues a channel recovery command, and cancels the pause state of the channel. The processing then returns to the determination of step S605.

When the below-described recording processing has ended normally, no channel in the pause state is present in step S605. When the power supply is cut off or the nonvolatile storage device 1 is pulled out during the recording processing, a channel in the pause state can be present. In such case, the update data of each contents management information file written to the save area 122 in the setup processing are reflected in the recording area 121, thereby enabling the recording from the abnormal state, such that occurs when the power supply is cut off or the nonvolatile storage device 1 is pulled out <<Recording Processing>>

The application unit 201 performs the recording processing after the abovementioned setup processing. There are a variety of triggers for starting the recording processing. For example, the timing designated by the user or the timing preceding by a fixed time interval the point of time at which the recording of contents data (AV input data) has been scheduled are such triggers. The recording start or recording end of new contents data can be also performed during the recording processing.

Figure 11:
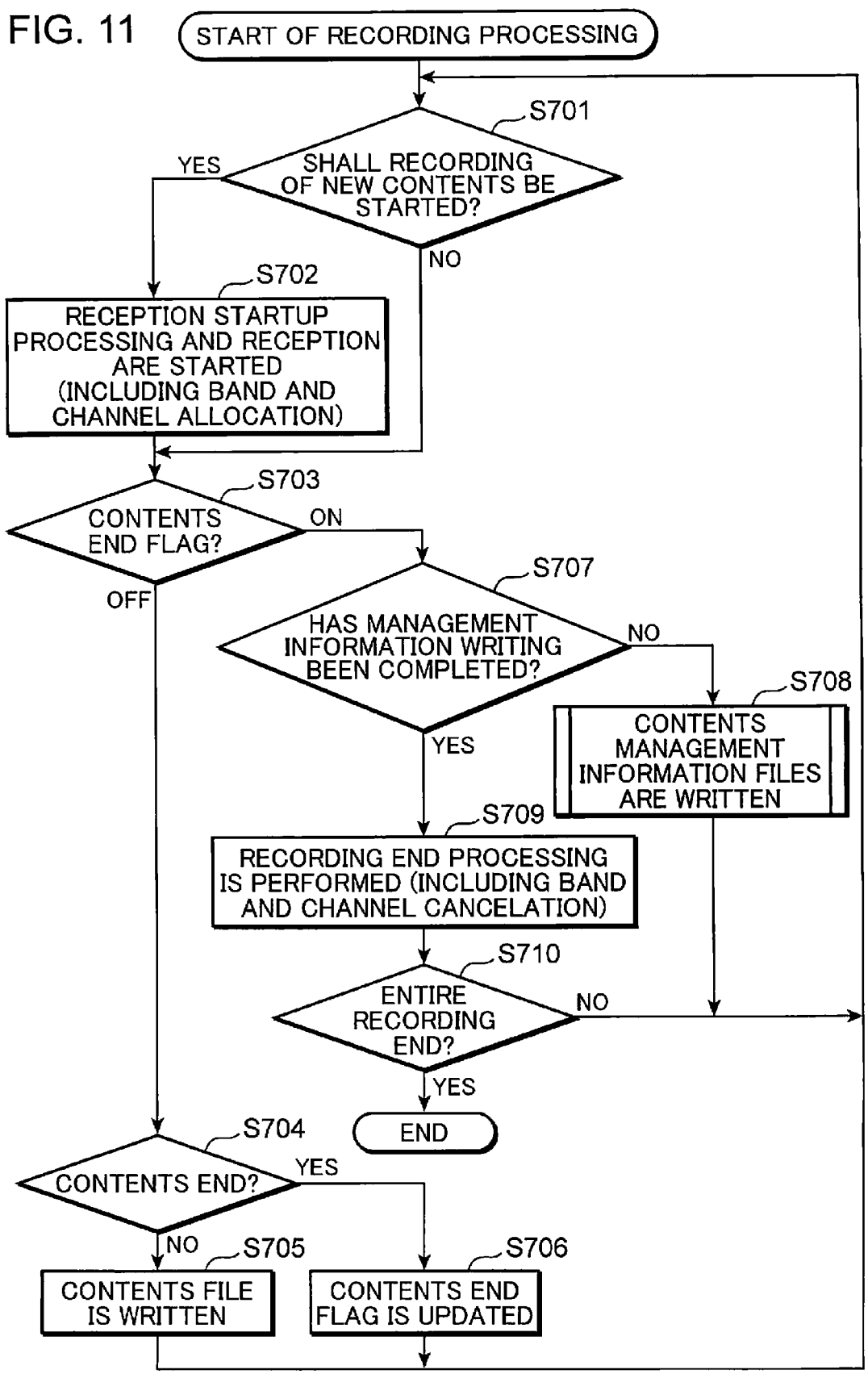
FIG. 11 is a flowchart illustrating a procedure of recording processing in the access device in Embodiment 1 of the present invention.

FIG. 11 is a flowchart illustrating a procedure of recording processing in the present embodiment. First, the processing performed in step S701 will be explained. The application unit 201 of the access device 2 looks up recording reservation information or input information from the user and determines whether or not the recording start of new contents data is necessary. If the recording start is necessary (the case of YES), the processing advances to step S702, and if the recording start is unnecessary (the case of NO), the processing advances to step S703.

The processing performed in step S702 will be explained below. The application unit 201 performs the setup processing for receiving the new contents data. For example, the application unit 201 ensures a buffer for temporarily storing the received contents data on the RAM 22 or performs the initial setting of the encoding unit 26 and encrypting unit 27.

Then, the band management unit 204 updates the band management table for writing the new contents data. More specifically, the band management unit 204 performs the processing of registering the contents number relating to the new contents data, allocating the channel numbers, setting the recording rate, setting the band information, setting the contents end flag (the initial value is OFF), setting the pause flag (the initial value is OFF), and the like.

Concerning the processing of setting the band information, resetting is performed in relation to all of the contents data that are being recorded. For example, in the case in which even one contents data is not being recorded, the entire band is allocated to the contents data (for example, contents number=C001) that will be further recorded. In this case, the band information in the band management table is set to "3 sec/3 sec" which means "allocation of 3 sec from among 3 sec".

When the recording of even newer contents data (for example, contents number=C002) is required to be started in this state, the band information is reset by a ratio of the recording rates of the simultaneously recorded contents data. In this case, a larger band is allocated to the contents data with a high recording rate.

As will be described below, the band management unit 204 resets the band information also after the contents data recording has ended, and it is preferred that the access time be reset each time the recording of contents data is started and/or ended. In this case, the adequate access time can be set according to the number of contents data that should be recorded, and a plurality of contents data can be recorded in parallel and at a high rate.

Further, during the abovementioned setting of band information, the band management unit 204 preferably allocates the access time for each contents data so that the access time increases with the increase in the recording rate of the contents data. In this case, a plurality of contents data can be recorded in parallel and at a high rate according to the recording rate of each contents data.

For example, if the recording rate of the first contents data (contents number=C001) is 2 MB/sec and the recording rate of the second contents data (contents number=C002) is 4 MB/sec, the band information of the former is set to "1 sec/3 sec", which means "allocation of 1 sec from among 3 sec", and the band information of the latter is set to "2 sec/3 sec", which means "allocation of 2 sec from among 3 sec". In this case, when the predetermined unit time interval is 3 sec, the interval of 3 sec is time divided into 1 sec and 2 sec according to the recording rate, the first contents data (contents number=C001) is recorded within 1 sec, then the second contents data (contents number=C002) is recorded within 2 sec, and these recording operations are repeated for each unit time, thereby recording the two data in parallel with time division multiplexing.

Once the abovementioned setup processing for writing the new contents data has been completed, the processing advances to step 703.

The processing performed in step S703 will be explained below. The band management unit 204 allocates the access time to the nonvolatile storage device 1 for recording of contents data with division in time on the basis of "BAND INFORMATION" of the band management table. The band management unit 204 looks up the "CONTENTS END FLAG" of the contents data to which the present access time has been allocated with respect to the nonvolatile storage device 1, and the processing advances to step S704 if the contents end flag is OFF and to step S707 if the contents end flag is ON.

The processing performed in step S704 will be explained below. The application unit 201 determines whether or not the contents file writing of the contents data to which the present access time has been allocated has ended. Where the writing has ended (the case of YES), the processing advances to step S706, and where the writing has not ended (the case of NO), the processing advances to step S705.

The processing performed in step S705 will be explained below. The application unit 201 writes the contents data that have accumulated in the buffer on the RAM 22 as a contents file to the nonvolatile storage device 1 via the file system unit 202 in relation to the contents data to which the present access time has been allocated. The channel number designated in the band management table is used during such writing. The processing then returns to step S701.

The processing performed in step S706 will be explained below. The band management unit 204 reflects in the band management table that the writing of the contents file of the contents data to which the present access time has been allocated has ended. More specifically, the band management unit 204 sets the corresponding contents end flag to ON. The processing then returns to step S701.

The processing performed in step S707 will be explained below. The application unit 201 determines whether or not the writing of all of the contents management information files relating to the contents data to which the present access time has been allocated has been completed. Where the writing of the contents management information files has ended (the case of YES), the processing advances to step S709, and where the writing of the contents management information files has not ended (the case of NO), the processing advances to step S708.

The processing performed in step S708 will be explained below. The application unit 201 performs writing of the contents management information files relating to the contents data to which the present access time has been allocated has been completed. However, the time allowed for the writing (access time) depends on the "BAND INFORMATION" of the band management table. For example, when the band management table is in the state shown in FIG. 2, and writing of the contents management information file with the contents number=C001 is performed, the band allowed in the processing of step S708 (time allowed for writing) is 1 sec. The procedure of writing the contents management information files will be described below in greater detail. The processing then returns to step S701.

The processing performed in step S709 will be explained below. The application unit 201 determines that the updating of the contents file and contents management information files of the contents data to which the present access time has been allocated has been completed and performs the recording end processing of the contents data. For example, the application unit 201 cancels the buffer for storing the received contents data that has been ensured on the RAM 22.

Further, the band management unit 204 cancels the information relating to the recorded contents data from the band management table. Concerning the setting of band information, resetting is performed with respect to all of the contents data that are being recorded (similarly to the processing of step S702). The processing then advances to step S710.

The processing performed in step S710 will be explained below. The application unit 201 determines whether or not the recording of all of the contents data has ended. Where the recording has ended (the case of YES), the recording processing is ended. Where the recording has not ended (the case of NO), the processing advances to step S701.

<<Contents Management Information File Writing>

Figure 12:
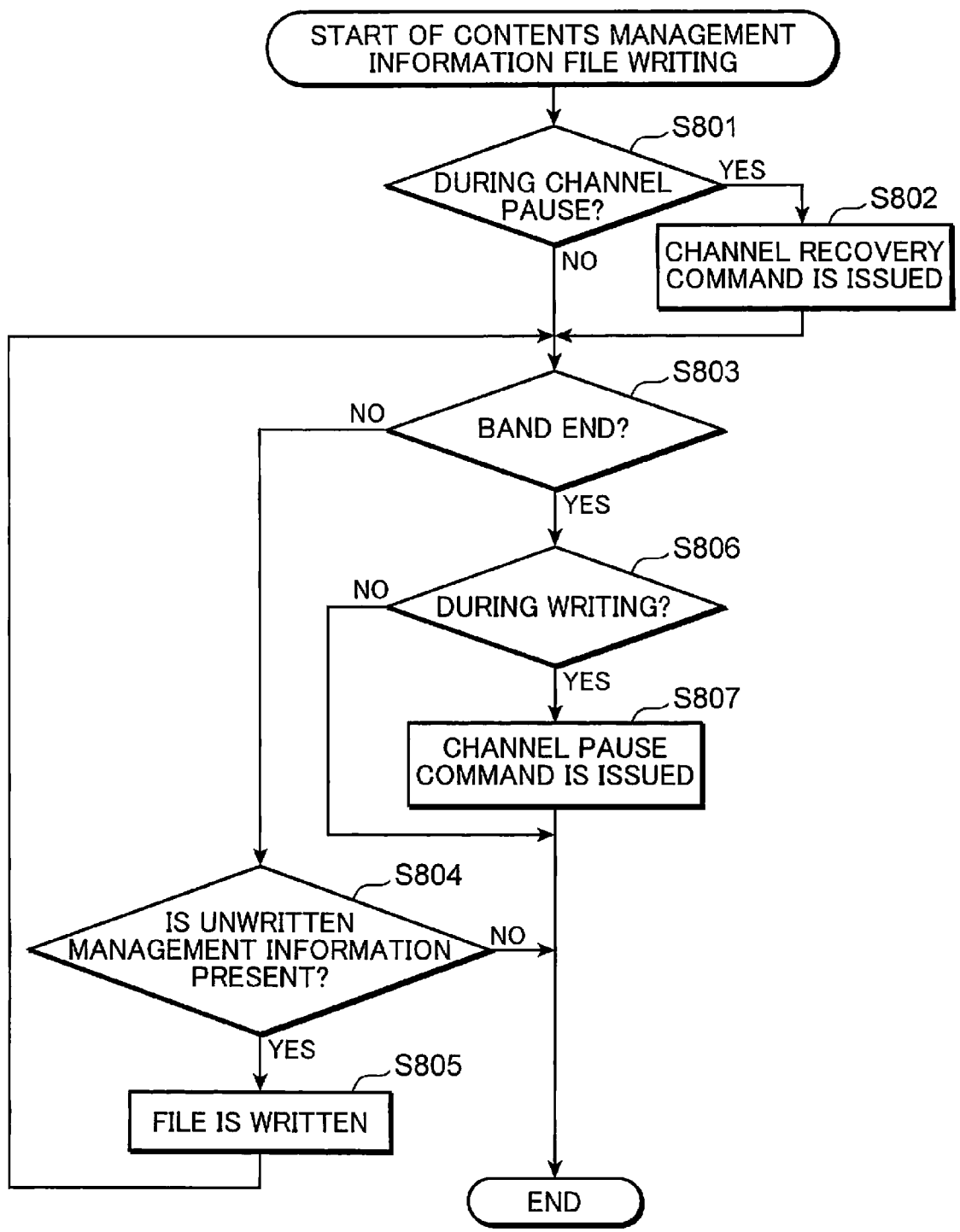
FIG. 12 is a flowchart illustrating a procedure of contents management information file writing in the access device in Embodiment 1 of the present invention.

The processing performed in step S708 will be explained below in greater detail. FIG. 12 is a flowchart illustrating a procedure of contents management information file writing in the access device 2.

First, the processing performed in step S801 will be explained below. The band management unit 204 looks up the band management table and determines whether or not the contents data to which the present access time has been allocated are in the pause state. When the pause flag is ON (the case of YES), the band management unit 204 determines that the contents data are in the pause state and the processing advances to step S802. By contrast, when the pause flag is OFF (the case of NO), the band management unit 204 determines that the contents data are not in the pause state and the processing advances to step S803.

The processing performed in step S802 will be explained below. Since the channel is in the pause state, the band management unit 204 issues a channel recovery command to the nonvolatile storage device 1 via the nonvolatile storage device IF unit 24. The nonvolatile storage device 1 recovers the channel from the pause state by performing the channel recovery command processing. The processing then advances to S803.

The processing performed in step S803 will be explained below. The band management unit 204 determines whether or not the band has ended by determining whether or not the presently allocated access time has elapsed. Where the access time has elapsed (the case of YES), the processing advances to step S806 to perform the processing for ending the band, and where the access time has not elapses (the case of NO), the processing advances to step S804.

The processing performed in step S804 will be explained below. The application unit 201 determines whether data of the contents management information files that have not yet been written are present. Where the data are present (the case of YES), the processing advances to step S805, and where the data are not present (the case of NO), the processing is ended.

The processing performed in step S805 will be explained below. The application unit 201 writes the data of the contents management information files that have not yet been written to the nonvolatile storage device 1 via the file system unit 202. The processing then returns to step S803. Where the band ends during writing, the processing immediately returns to step S803, while the writing is being continued.

The processing performed in step S806 will be explained below. The application unit 201 determines whether or not the data of the contents management information files are being written. Where the data are being written (the case of YES), the processing advances to step S807, and where the data are not being written (the case of NO), the processing is ended.

The processing performed in step S807 will be explained below. Where the data of the contents management information files are being written, the band management unit 204 issues a channel pause command to the nonvolatile storage device 1 via the nonvolatile storage device IF unit 24. When the nonvolatile storage device 1 performs the channel pause command processing, the processing preformed during writing (within the predetermined time interval T) assumes rapidly a pause state. The band management unit 204 updates the band management table and sets the pause flag of the paused channel number to ON. The processing is then ended.

<<Allocation of Band in Recording Processing>>

Figure 13:
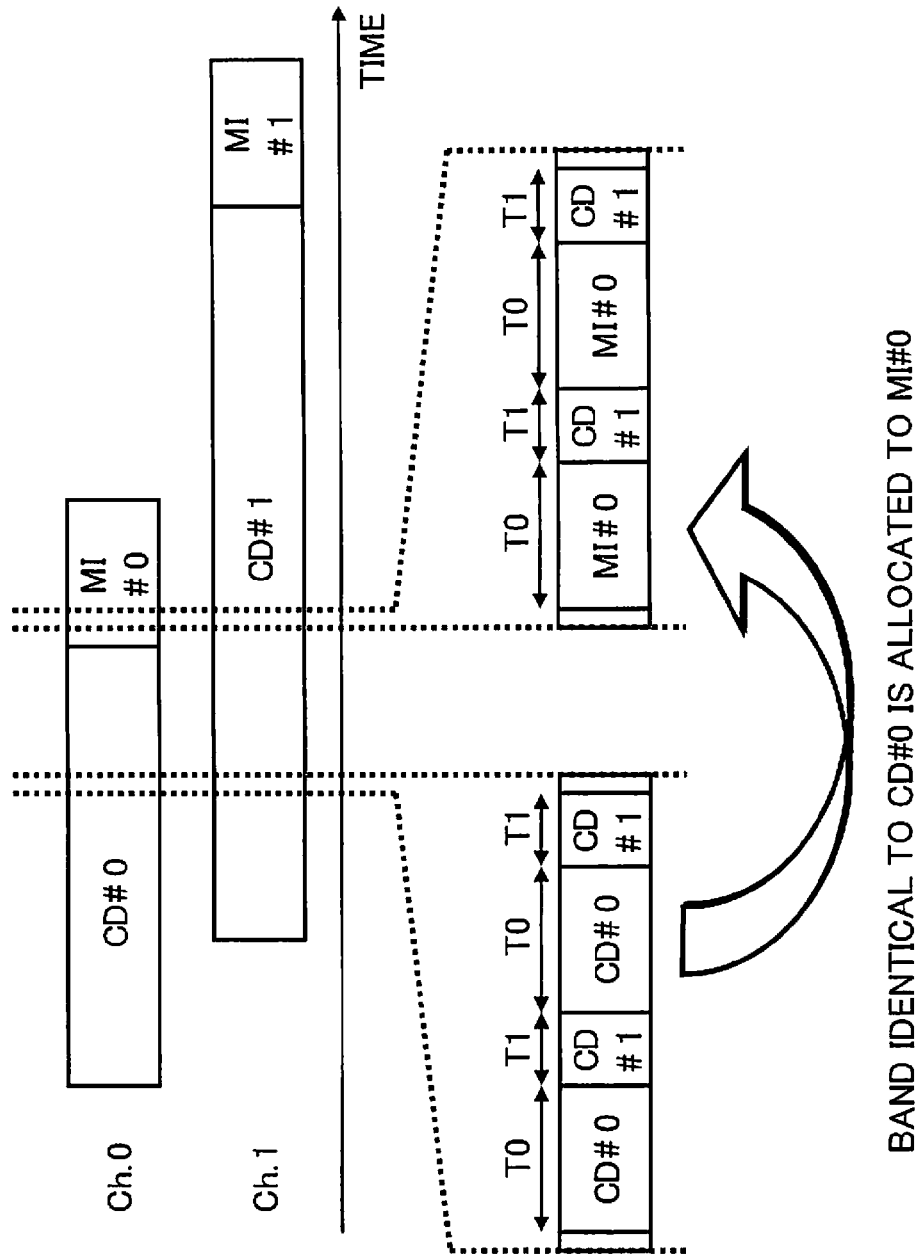
FIG. 13 is an explanatory drawing illustrating an example of band allocation in the recoding processing according to Embodiment 1 of the present invention.

FIG. 13 is an explanatory drawing illustrating an example of band allocation in the recoding processing according to the present embodiment.

In the example shown in FIG. 13, after the contents file using the channel number 0 (Ch. 0) has been written (CD#0), at least one contents management information file relating thereto is written (MI#0). Further, after the contents file using the channel number 1 (Ch. 1) has been written (CD#1) in parallel with the writing based on the channel number 0, at least one contents management information file relating thereto is written (MI#1).

The band information allocated for writing CD#0 and CD#1 in the band management table is taken as (T0/(T0+T1)) and (T1/(T0+T1)), respectively. Thus, the writing of CD#0 is the "allocation of (T0) sec within (T0+T1) sec" and the writing of CD#1 is the "allocation of (T1) sec within (T0+T1) sec".

When the recording of CD#0 has ended, the contents end flag relating to CD#0 is set ON in the band management table and the writing of MI#0 is started. In this case, the band information allocated for writing of MI#0 and CD#1 remains (T0/(T0+T1)) and (T1/(T0+T1)), respectively. Therefore, even when the writing of MI#0 is started, the band for writing of CD#1 is maintained and ensured at the same size, thereby making it possible to continue the real time recording of CD#1. In this case, in the present embodiment, plan is introduced to issue a channel pause command in step S807 shown in FIG. 12 and pause the writing rapidly in order to confine the MI#0 writing time within the band (T0).

<1.3. Conclusion>

As described hereinabove, in the nonvolatile storage system 1000, when the access device 2 performs real time recording of a plurality of contents data in the nonvolatile storage device 1 by time division multiplexing, the contents management information files relating to a contents file are also written by using a band allocated for writing the contents file. When the nonvolatile storage device 1 requires a long time to write the contents management information files, the access device 2 pauses the writing by issuing a channel pause command and controls the band.

As a result, in the present embodiment, it is not necessary to allocate a channel number to each of the contents management information files. Therefore, it is possible to provide the nonvolatile storage device 1, access device 2, and nonvolatile storage system 1000 in which the contents file and the plurality of contents management information files can be written in parallel without decreasing the writing performance, while inhibiting the increase in the channel number used.

The numerical values described in the abovementioned embodiment are exemplary and other values may be used. For example, the numerical values of channel numbers that are managed are all exemplary and are not limited to the values described in the embodiment.

Embodiment 2

<2.1. Configuration of Nonvolatile Storage System>

Figure 14:
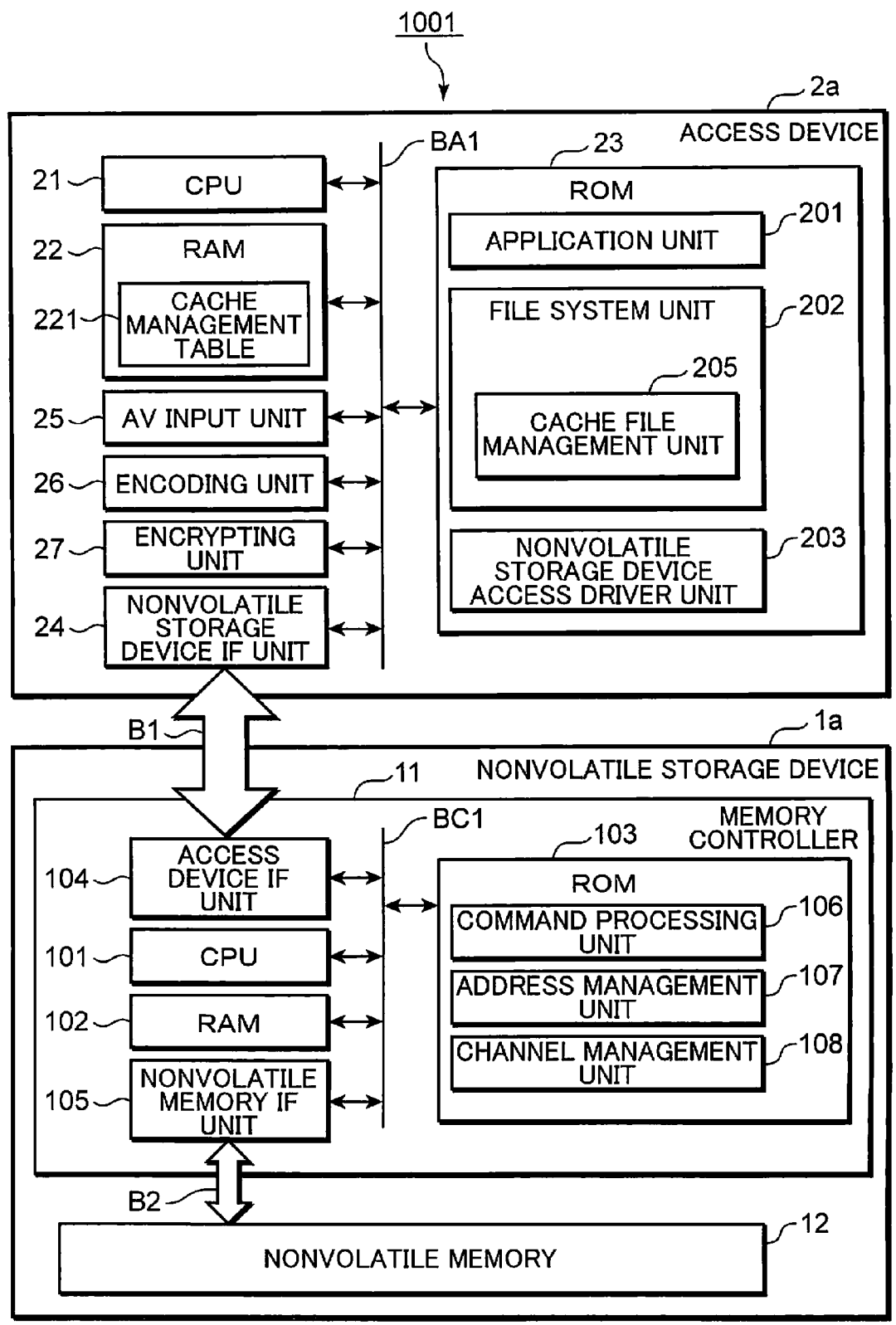
FIG. 14 is a block diagram illustrating the configuration of the nonvolatile storage system in Embodiment 2 of the present invention.

FIG. 14 is a block diagram illustrating the configuration of the nonvolatile storage system 1001 of Embodiment 2 of the present invention. As shown in FIG. 14, the nonvolatile storage system 1001 includes a nonvolatile storage device 1a and an access device 2a having the nonvolatile storage device 1a mounted thereon. The nonvolatile storage device 1a and the access device 2a are connected by a bus B1 and communication therebetween can be conducted in both directions. The nonvolatile storage device 1a reads and/or writes data in response to an instruction from the access device 2a. The nonvolatile storage device 1a is for example, a semiconductor memory card. The access device 2a is for example a video recorder that records video contents onto the semiconductor memory card.

(2.1.1. Configuration of the Access Device)

As shown in FIG. 14, the access device 2a includes a CPU 21, a RAM 22, a ROM 23, a nonvolatile storage device interface (IF) unit 24, an AV input unit 25, an encoding unit 26, and an encrypting unit 27. The functional units of the access device 2a are connected by a bus BA1, as shown in FIG. 14. The access device 2a may be configured so that some or all of the functional units of the access device 2a are directly connected.

The CPU 21 performs various types of control of the access device 2a by using the RAM 22 and the ROM 23.

The RAM 22 can execute the read/write processing of various types of data with respect to a predetermined address. The data stored in the RAM 22 can be accessed from the CPU 21 or each functional unit of the access device 2a. The RAM 22 includes a cache management table 221.

The ROM 23 stores a program that controls the access device 2a. This program is loaded into the RAM 22 and executed by the CPU 21.

The nonvolatile storage device IF unit 24 is a unit connecting the nonvolatile storage device 1a and the access device 2a.

The control signals and data are transmitted between the access device 2a and the nonvolatile storage device 1a via the nonvolatile storage device IF unit 24.

The AV input unit 25 receives AV input data (video images, voice data, and control data related thereto) such as broadcasting waves from the outside. The AV input data received by the AV input unit 25 are subjected to processing according to the program stored in the ROM 23, encoding with the encoding unit 26, or encrypting with the encrypting unit 27, and the contents data are stored as a contents file and contents management information files in the nonvolatile storage device 1a.

The contents data as referred to herein are data that are divided into a contents file that stores the contents and a plurality of contents management information files that store related information (for example, a name, a thumbnail image, a time search table, a bit rate, a reproduction time, encryption information, and the like) attached to the contents. The divided contents data are stored in the nonvolatile storage device 1a.

The encoding unit 26 performs encoding, with a predetermined encoding system, of the AV input data received by the AV input unit 25.

The encrypting unit 27 performs encryption, with a predetermined encryption system, of the AV input data (for example, AV input data that are instructed to be encrypted) received by the AV input unit 25 or the AV input data encoded with the encoding unit 26.

As shown in FIG. 14, the ROM 23 includes an application unit 201, a file system unit 202, and a nonvolatile storage device access driver unit 203. In the present embodiment, the application unit 201, file system unit 202, and nonvolatile storage device access driver unit 203 are assumed to be realized with software on the ROM 23, but such a configuration is not limiting. For example, some or all of the application unit 201, file system unit 202, and nonvolatile storage device access driver unit 203 of these units can be realized with hardware.

The application unit 201 controls the entire access device 2a by controlling data generation or power source.

The file system unit 202 performs control for managing data as files with a file system such as a FAT file system. In the present embodiment, the file system unit 202 includes a cache file management unit 205. The cache file management unit 205 performs management of a management information cache file (referred to hereinbelow as MICF) that is created when a contents management information file is written to the nonvolatile storage device 1a, that is, performs creation, updating, deletion and lookup operations. The cache file management unit 205 uses the cache management table 221 located in the RAM 22 to perform the MICF management.

The nonvolatile storage device access driver unit 203 controls transmission and reception of commands and data to and from the nonvolatile storage device 1a, for example, transfers data together with the data size and address from the file system unit 202 and records data of the designated size at the designated position in the storage area of the nonvolatile storage device 1a.

Further, the application unit 201, file system unit 202, and nonvolatile storage device access driver unit 203 function as a writing unit and perform writing of the contents files to the nonvolatile storage device 1a. In this case, the application unit 201 and the file system unit 202 correspond to an example of a writing unit, and the cache file management unit 205 corresponds to an example of a management unit.

(2.1.2. Configuration of Nonvolatile Storage Device)

As shown in FIG. 14, the nonvolatile storage device 1a includes a memory controller 11 and a nonvolatile memory 12 that stores data. The memory controller 11 and the nonvolatile memory 12 are connected to one another by a bus B2. The memory controller 11 performs data exchange (data read/write, command transmission, response reception, etc.) with the nonvolatile memory 12 via the bus B2 and can control the nonvolatile memory 12.

The memory controller 11 is a module that performs the entire control of the nonvolatile storage device 1a and is configured, for example, by LSI including a CPU or the like. The nonvolatile memory 12 is configured, for example, by at least one NAND flash memory.

As shown in FIG. 14, the memory controller 11 includes a CPU 101, a RAM 102, a ROM 103, an access device IF unit 104, and a nonvolatile memory IF unit 105. The functional units of the memory controller 11 are connected with one another via a bus BC1, as shown in FIG. 14. The memory controller 11 may also have a configuration in which some or all of the functional units of the memory controller 11 are directly connected to one another.

The access device IF unit 104 is a unit connecting the nonvolatile storage device 1a with the access device 2a. Control signals and data are exchanged between the access device 2a and the nonvolatile storage device 1a via the access device IF unit 104 in the same manner as via the nonvolatile storage device IF unit 24.

The ROM 103 stores a program that controls the nonvolatile storage device 1a. This program is loaded into the RAM 102 and executed by the CPU 101.

The nonvolatile memory IF unit 105 is a unit connecting the memory controller 11 with the nonvolatile memory 12. Commands or data for the nonvolatile memory 12 are exchanged between the memory controller 11 and the nonvolatile memory 12 via the nonvolatile memory IF unit 105.

More specifically, as shown in FIG. 14, the ROM 103 includes a command processing unit 106, an address management unit 107, and a channel management unit 108. In the present embodiment, the command processing unit 106, address management unit 107, and channel management unit 108 are assumed to be executed with software on the ROM 103, but such a configuration is not limiting. For example, some or all of the command processing unit 106, address management unit 107, and channel management unit 108 can be realized with hardware.

The command processing unit 106 is a functional unit that interprets the command received from the access device 2a via the access device IF unit 104 and parameters relating to the command and executes the processing of the command.

The address management unit 107 performs the entire address management of the nonvolatile memory 12. The address management unit 107 manages the association of a logical address in a logical address space provided by the nonvolatile storage device 1a as an address space accessible from the access device 2a and a physical address. The address management unit 107 also manages a physical address of a free block, which is a block that stores no valid data and can be reused for data writing, a physical adders of a bad block that cannot be used for data writing, and a physical address of a block that stores a conversion table for logical addresses and physical addresses.

The channel management unit 108 allocates physical blocks of write destination for each channel number designated by the access device 2a during data writing and manages the write state. As a result, the degradation of write performance is prevented even when the access device 2a performs parallel writing of different channel numbers.

The nonvolatile memory 12 is a section that stores data written from the access device 2a or system information that is used internally by the nonvolatile storage device 1a.

(2.1.3. Directory and File Configuration)

In the access device 2a, the management of the recording area of data provided by the nonvolatile storage device 1a is performed by the file system. In the present embodiment, the FAT file system (FAT12, FAT16, FAT32, exFAT, etc.) that has been generally used in the semiconductor memory card is used, but another file system such as an independent file system or an UDF may be also used.

Figure 15:
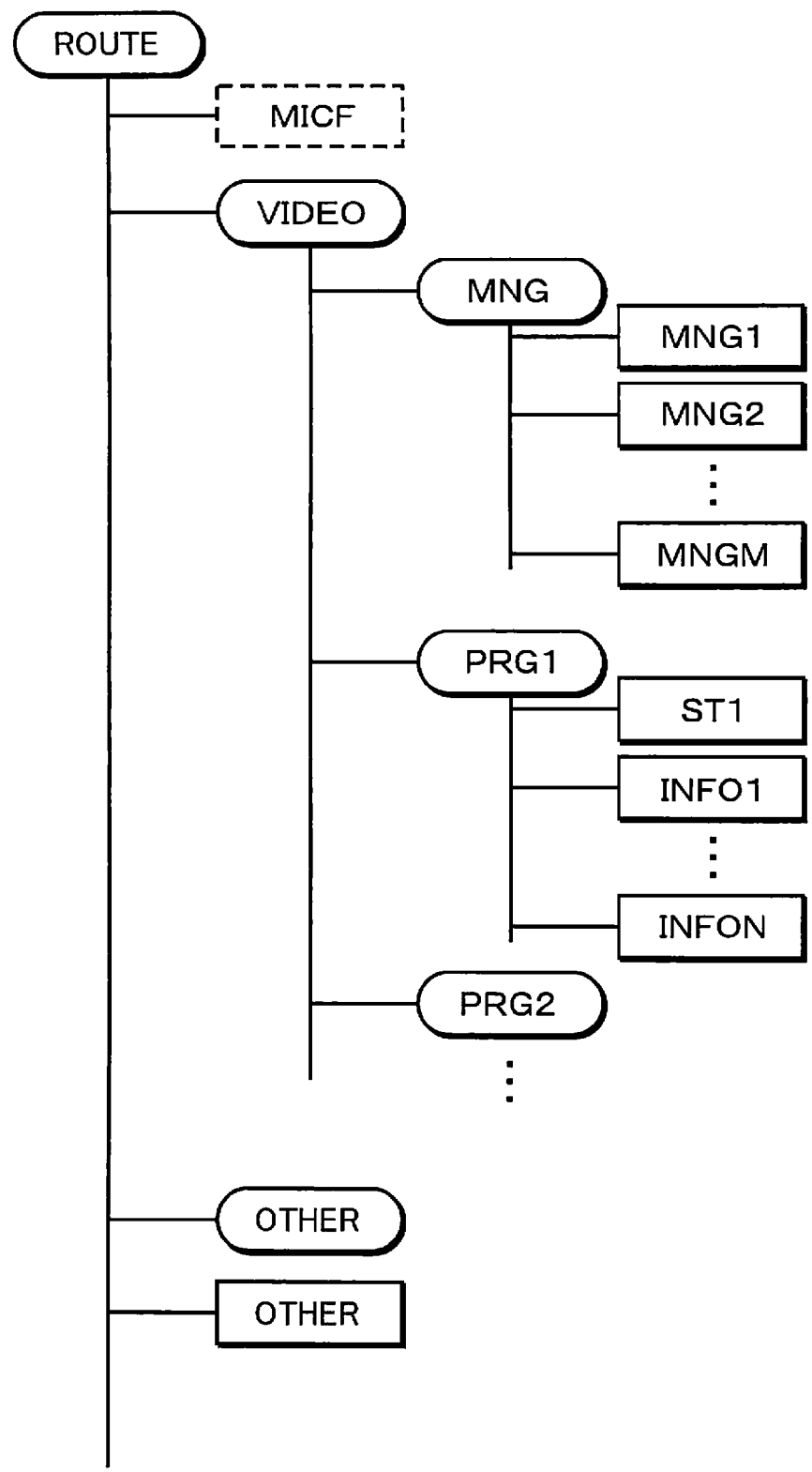
FIG. 15 is an explanatory drawing illustrating an example of directory and file configuration in the case in which the application unit of the access device in Embodiment 2 of the present invention stores the contents data in the nonvolatile storage device.

FIG. 15 illustrates an example of directory and file configuration when the application unit 201 of the access device 2a stores (records) the AV contents in the nonvolatile storage device 1a.

In the present embodiment, a "VIDEO" directory is created immediately below the route directory, and "PRG1" and "PRG2" directories that store individual AV contents are created immediately below the "VIDEO" directory. Further, a "ST1" file of a contents file that is a video-audio stream data body and N files "INFO1", "INFO2", . . . , "INFON", which are contents management information files where metadata of the contents file have been saved, are created in the "PRG1". A group of files similar to that created in the "PRG1" is also created in the "PRG2" directory.

Further, a directory "MNG" storing metadata (for example, the total number of AV contents data, total reproduction time, play list, etc.) relating to all of the AV contents data is created immediately below the "VIDEO" directory. A total of M files, namely, "MNG1", "MNG2", . . . , "MNGM" files, which are contents management information files, are created immediately below the "MNG" directory.

Therefore, when the access device 2a records one AV contents, a plurality of contents management information files (for example, files corresponding to the abovementioned "INFO1" and "MNG1") should be written in addition to the contents files. Data of different files are typically stored at different logical addresses. Therefore, when such a plurality of contents management information files are updated, data of small size are written to a plurality of random logical addresses that are not consecutive.

Such random writing generally degrades the write performance. Where writing is performed by allocating a channel number of each contents management information file as a countermeasure, a large number of channel numbers are required and the aforementioned problem is encountered. Accordingly, in the present embodiment, a MICF, which is a file for storing temporarily the update information of a plurality of contents management information files, is generated immediately below the route directory and used to prevent such random writing from being performed during real time recording of the AV contents.

(2.1.4. Data Format of MICF)

Figure 16:
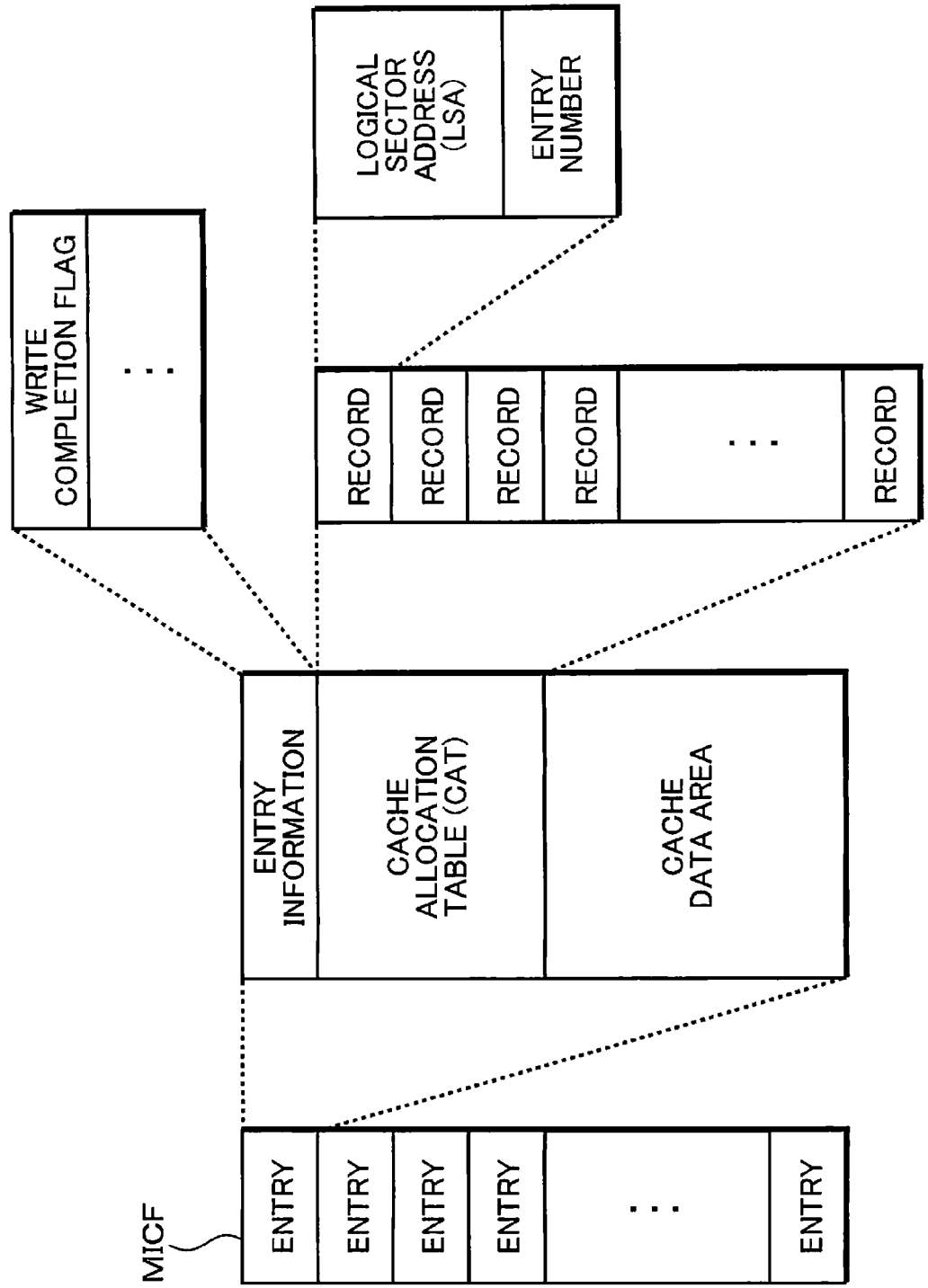
FIG. 16 is illustrates an example of data format of the MICF in Embodiment 2 of the present invention.

FIG. 16 shows an example of data format of a MICF. In the present embodiment, the MICF is constituted by a set of update units called fixed-length entries. The size of each entry is a size of data (written from the access device 2a) that can be stored in a physical page, which is a write unit of the NAND flash constituting the nonvolatile memory 12 of the nonvolatile storage device 1a, or an integer multiple of this size. More specifically, the entry size is 8 kB, 16 kB, or 256 kB.

Further, the size of a MICF is a size of data (written from the access device 2a) that can be stored in a physical block, which is a delete unit of the NAND flash, or an integer multiple of this size. More specifically, the size of a MICF is 1 MB, 4 MB, or 64 MB.

Each entry is constituted by entry information, a cache location table (referred to hereinbelow as CAT), and a cache data area. The cache data area is an area for storing update information of the contents management information files. The entry information is an area for storing information relating to the entry. The entry information includes the "WRITE COMPLETION FLAG", which is information for determining whether at least the cache data of the entry have been written.

The CAT is a table for retrieving the update information of the contents management information files written to the MICF. The CAT is constituted by a plurality of records. Each record is constituted by a "LOGICAL SECTOR ADDRESS" (referred to hereinbelow as ISA) of cache data stored in the MICF and an "ENTRY NUMBER" of the storage destination entry. The LSA of the records are assumed not to overlap.

<2.2. Operation of Cache File Management Unit>

The operation of the cache file management unit 205 that performs the management of MICF will be explained below.

(2.2.1. MICF Creation Processing)

Figure 17:
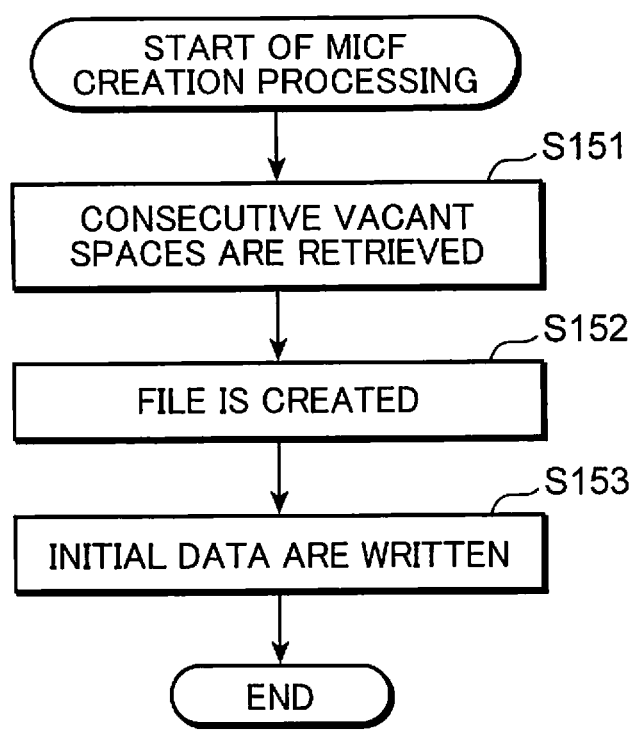
FIG. 17 is a flowchart illustrating a procedure of MICF creation processing in Embodiment 2 of the present invention.

FIG. 17 is a flowchart illustrating a procedure of MICF creation processing in the present embodiment.

First, the processing performed in step S151 will be explained. The cache file management unit 205 determines the size of the MICF that will be created. The MICF size may be a fixed size determined in advance by specification of the access device 2a or the like. Further, this size may be determined with reference to the storage capacity of the nonvolatile storage device 1a.

Then, the cache file management unit 205 retrieves a vacant area for creating a MICF from the file system management information that has been read from the nonvolatile storage device 1a. The vacant area is a area having a consecutive address in a physical block unit, which is a delete unit of the NAND flash constituting the nonvolatile memory 12 of the nonvolatile storage device 1a, or in units that are integer multiples thereof, and the start address of the vacant area is an address obtained by alignment in the aforementioned units. Thus, the cache file management unit 205 ensures, before the write start of the contents file, a fixed area and a consecutive address space as an area in which the file data of the MICF will be written.

For example, when the physical block is 4 MB units (number of sectors is 2000 h:hexadecimal number), the cache file management unit 205 ensures an area of 32 MB from the sector address of 10,000 h (hexadecimal number) to the sector address 1FFFFh (hexadecimal number) as a vacant area.

Such an area is ensured so that the write data be consecutively written to the nonvolatile storage device 1a when the MICF data are written consecutively from the head. Such an approach guarantees most efficient writing to the physical block when the writing is performed consecutively from the head.

The processing performed in step S152 will be explained below. The cache file management unit 205 creates a MICF for which the vacant area retrieved in step S151 is a storage area of the file data. More specifically, the cache file management unit 205 writes the file system management information (FAT, Bitmap, file entry information, and the like) of the MICF to the nonvolatile storage device 1a.

Finally, the processing performed in step S153 will be explained. The cache file management unit 205 writes the initial data of MICF consecutively from the MICF head. A write completion flag of each entry is set to OFF (not written) as initial data. Invalid data are written in other areas. FIG. 18 shows an example of MICF state after the MICF creation processing.

For example, in the first entry (Entry #1), the write completion flag is set to OFF, and invalid data are written to the LSA and entry number of the first record (Record #1). In other records, invalid data are similarly written to the LSA and entry number of all of the records. Further, invalid data are also written to the cache data. For the second entry (Entry #2) and subsequent entries, data are written in the same manner as described above.

The MICF created in the MICF creation processing in the present embodiment, is assumed not to change the size thereof in subsequent processing. This is because where the MICF size changes, the file system management information (FAT, Bitmap, file entry information, and the like) relating to the MICF is updated and writing of a random address is required for the nonvolatile storage device 1a.

(2.2.2. Management Information Write Processing)

As a basic rule of writing to the MICF, the writing is performed in entry units successively from the MICF head. Where such writing method is combined with the abovementioned method of ensuring the file data storage area during the MICF creation processing, the write data are consecutively written to the physical block in the nonvolatile storage device 1a.

The write completion flags of the entries are all OFF (not yet written) immediately after the MICF creation processing, and the flags are successively set ON (entry has been written) from the leading entry each time a new entry is written. Further, the entry CAT is replaced with the newest information each time the entry is written. Therefore, the CAT of the finally written entry, that is, the very last entry for which the write completion flag has become ON (entry has been written) when retrieved from the head, is the newest information. When all of the write completion flags are OFF (not yet written), the newest information of the CAT is an initial value (a state in which there is no even one valid record).

Figure 19:
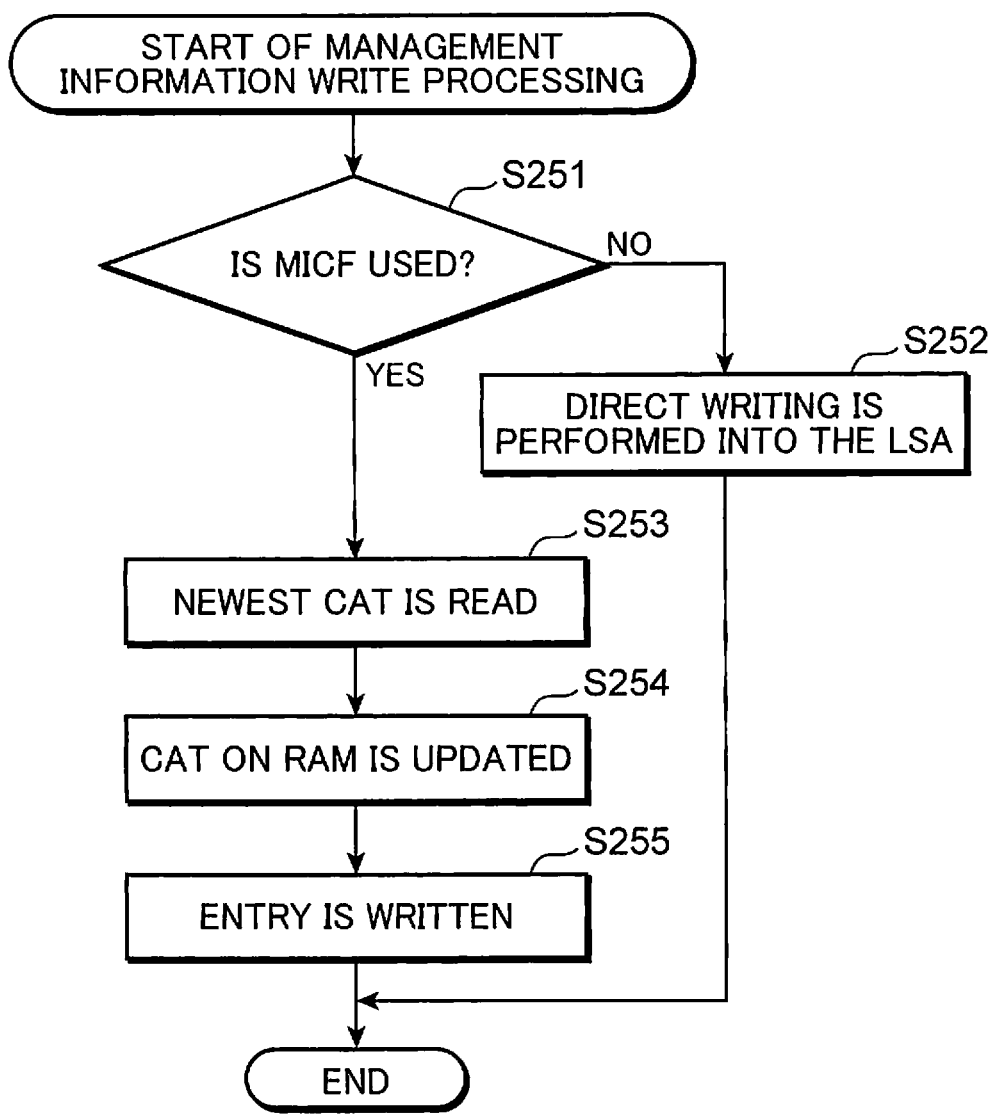
FIG. 19 is a flowchart illustrating the procedure of management information write processing using the MICF in Embodiment 2 of the present invention.

FIG. 19 is a flowchart illustrating the procedure of management information write processing using the MICF in the present embodiment. The management information write processing is executed in 1 selector unit according to the present flowchart. Before this processing is executed, the file system unit 202 looks up the file system management information of the contents management information file and retains the logical sector address (LSA_W) and data of the write object.

First, the processing performed in step S251 will be explained. The file system unit 202 determines whether or not to perform the writing using the MICF on the basis of the designation from the application unit 201. Under conditions with severe restrictions relating to the writing time that occurs, for example, during real time recording of contents data, the application unit 201 designates the writing using the MICF. When the MICF is not used (the case of NO), the processing of step S252 is performed and the processing is thereafter ended. When the MICF is used (the case of YES), the processing of steps S253 to S255 is performed and the processing is thereafter ended.

The processing performed in step S252 will be described below. When the MICF is not used, the file system unit 202 writes data to the nonvolatile storage device 1a. The file system unit 202 designates the logical sector address (LSA_W) itself as the write destination address.

The processing performed in step S253 will be described below. When the MICF is used, the file system unit 202 notifies the cache file management unit 205 of the logical sector address (LSA_W) and data of the write object.

The cache file management unit 205 reads the newest CAT of the MICF stored in the nonvolatile storage device 1a to the cache management table 221. Where the newest CAT is already present in the cache management table 221, the write processing may be skipped.

The processing performed in step S254 will be described below. The cache file management unit 205 updates the CAT of the cache management table 221 according to the write object. More specifically, the cache file management unit 205 looks up each record of CAT of the cache management table 221 and determines whether or not the identical ISA (LSA_W) is present. Where the identical LSA is not present, one invalid record is selected, LSA is updated to LSA-W, and the entry number is updated to the number of the entry that will be thereafter written (that is, the leading unwritten entry). Where the identical LSA is present, the entry number of this record is updated to the number of the entry that will be thereafter written (that is, the leading unwritten entry). Such processing prevents the identical LSA from being superimposed when registered in the CAT.

Finally, the processing performed in step S255 will be explained. The cache file management unit 205 writes the leading unwritten entry of the MICF of the nonvolatile storage device 1a. In this case, the write completion flag is ON, the CAT is a value obtained in step S254, and the cache data are the write object data. The entry writing is assumed to be conducted sequentially from the entry head.

Figure 20:
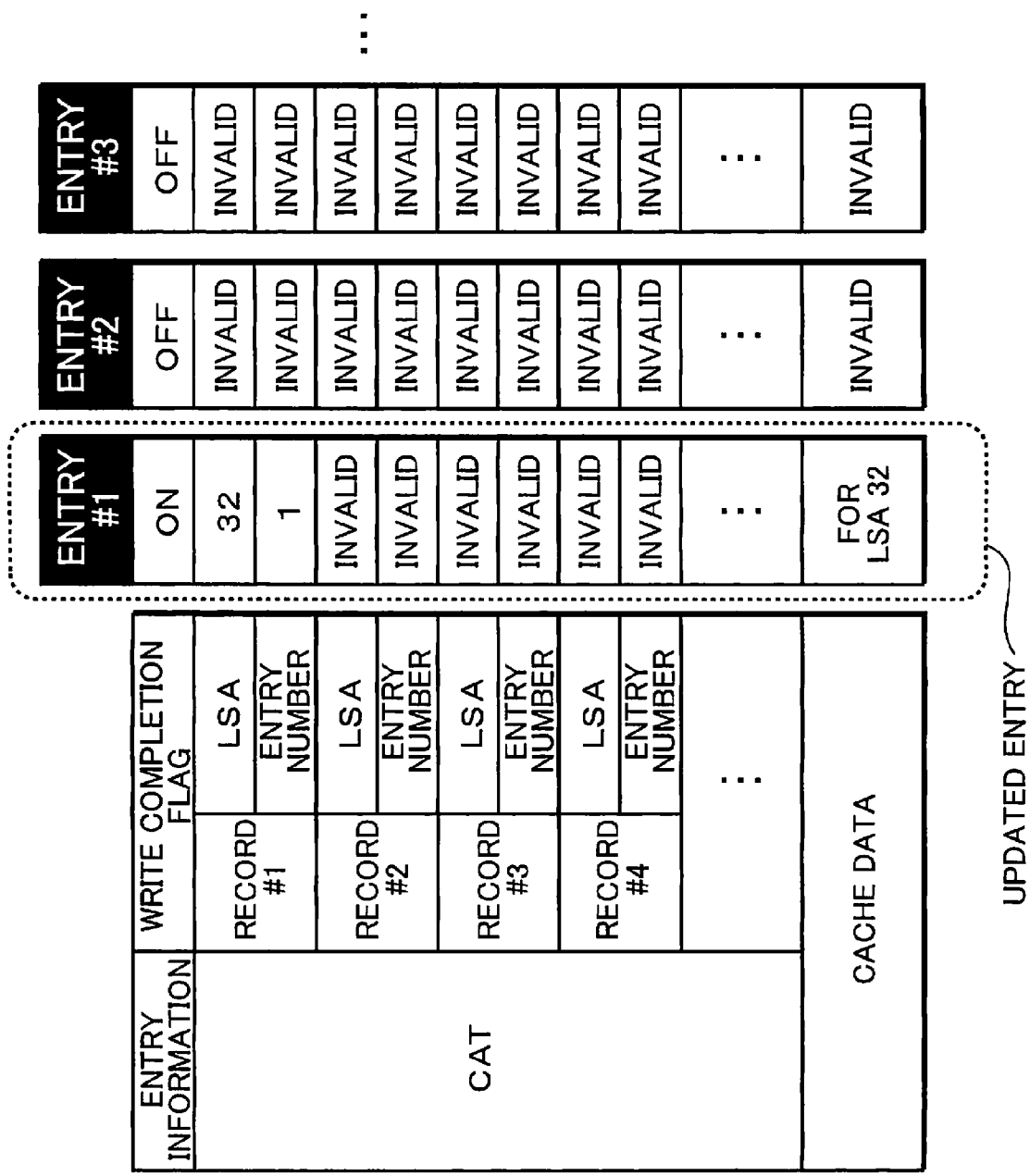
FIG. 20 illustrates an example of MICF state after the management information write processing has been performed once after the MICF creation processing in Embodiment 2 of the present invention.

FIG. 20 illustrates an example of MICF state after the management information write processing has been performed once after the MICF creation processing in the present embodiment. In the first entry, the write completion flag is set ON, 32 is written in the LSA of the first record of the CAT, 1 is written in the entry number, and the management information (data of the contents management information file) for the LSA 32 is written as the cache data.

Figure 21:
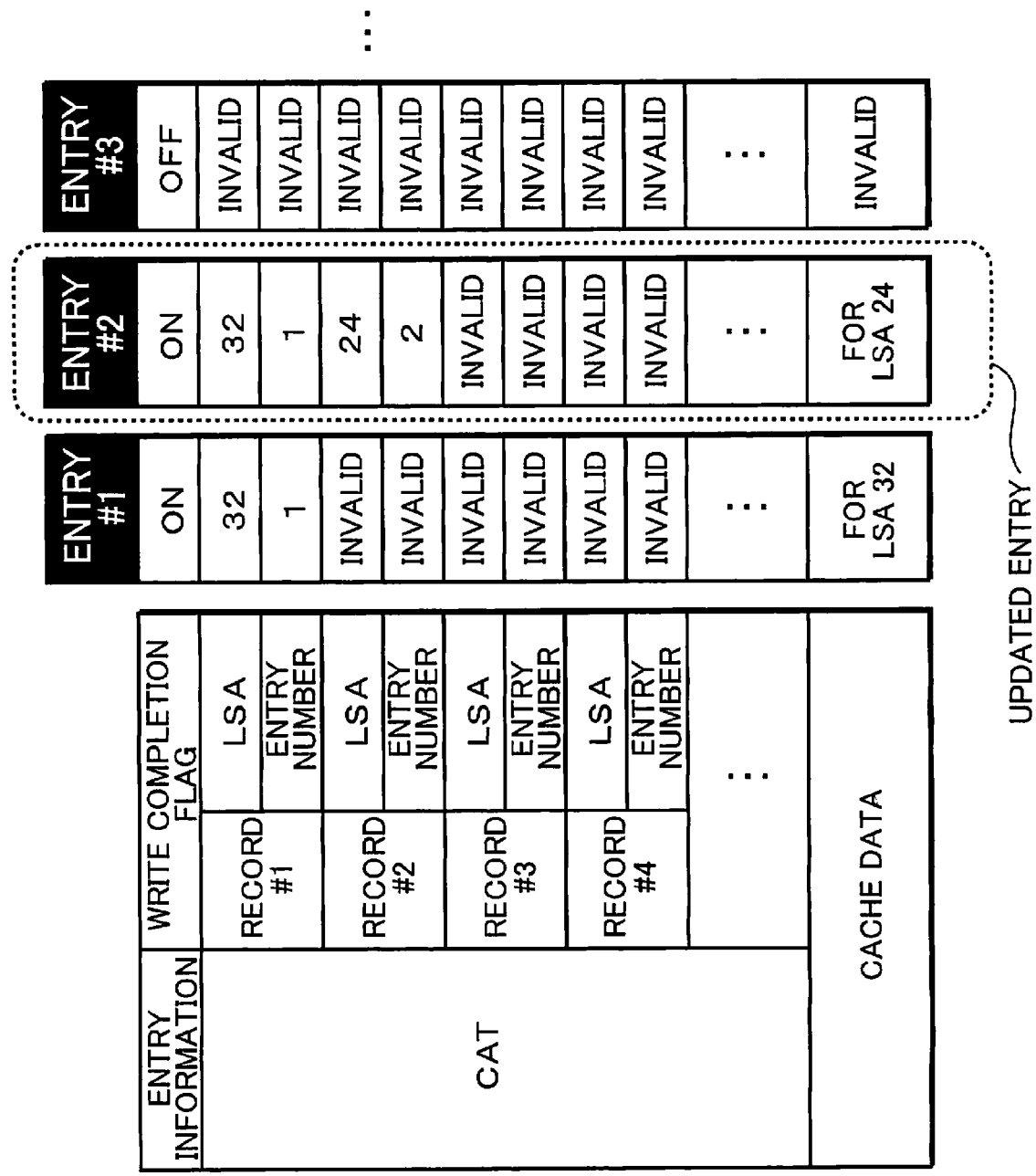
FIG. 21 illustrates an example of MICF state after the management information write processing has been performed twice after the MICF creation processing in Embodiment 2 of the present invention.

FIG. 21 illustrates an example of MICF state after the management information write processing has been performed twice after the MICF creation processing in the present embodiment. In the second entry, the write completion flag is set ON, 24 is written in the LSA of the second record of the CAT, 2 is written in the entry number, and the management information for the LSA 24 is written as the cache data. In this case, the cache data of the first entry are also continuously registered in the CAT.

FIG. 22 illustrates an example of MICF state after the management information write processing has been performed three times after the MICF creation processing in the present embodiment. In the third entry, the write completion flag is set ON, 32 is written in the LSA of the first record of the CAT, 3 is written in the entry number, and the management information for the ISA 32 is written as the cache data. In this case, the cache data of the first entry are deleted from the CAT and replaced with the third entry. The cache data of the second entry are also continuously registered in the CAT.

(2.2.3. Management Information Read Processing)

As a basic rule of management information reading, the MICF data are read preferentially. The reason therefor will be explained below.

The MICF is assumed to be used as a means for temporarily writing the contents management information files to the nonvolatile storage device 1a under conditions with severe restrictions relating to the writing time such that occur during real time recording of contents data. Therefore, at a point of time in which the timely restrictions are relaxed, for example, after the real time recording has ended, the management information written to the MICF is eventually reflected in (copied to) the original contents management information file and thereafter deleted. Therefore, the MICF stores at all times the data that are newer than or identical to those of the original contents management information file. When reading is performed, the MICF data are read preferentially to output the new data at all times.

Figure 23:
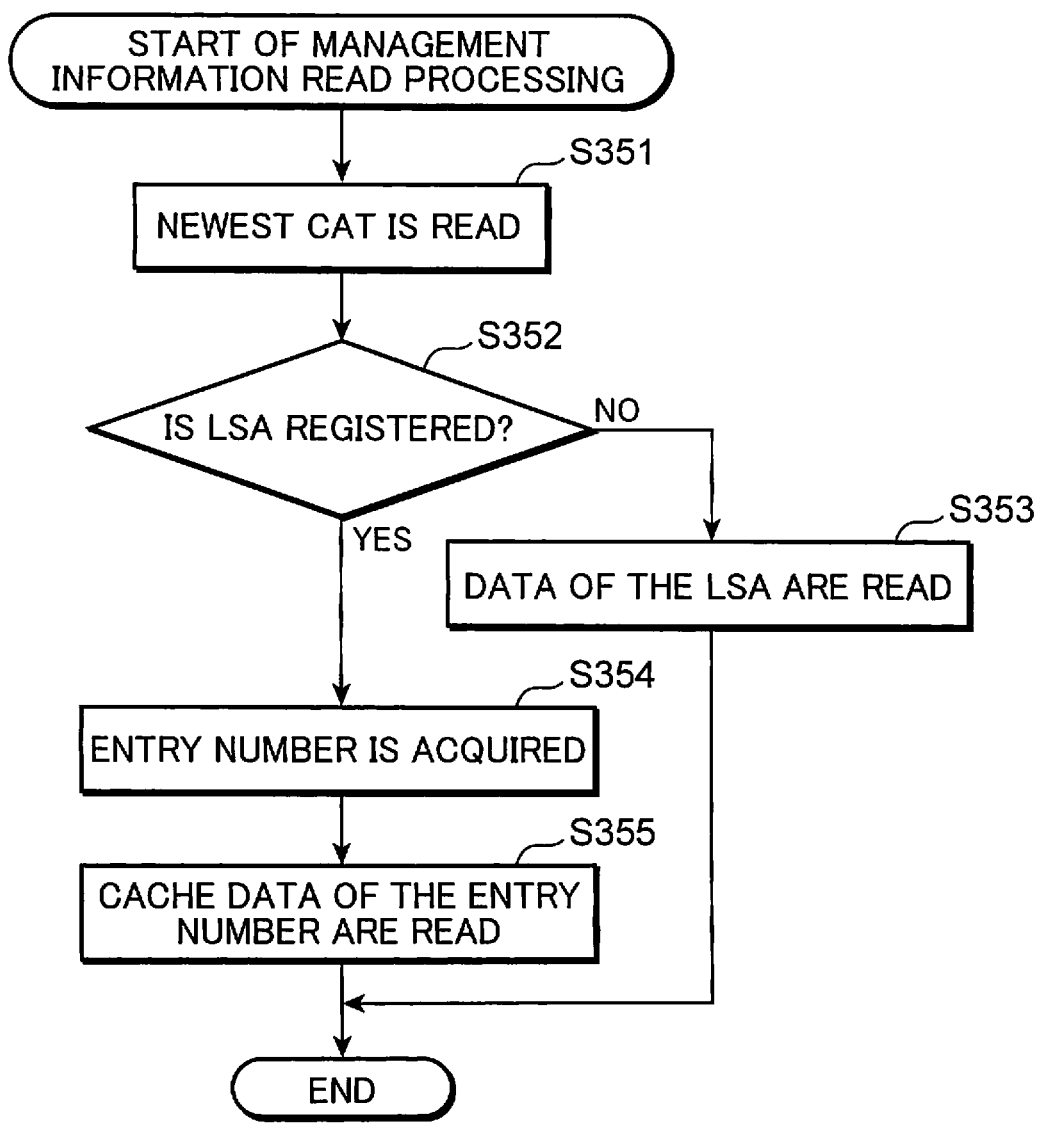
FIG. 23 is a flowchart illustrating the procedure of management information read processing using the MICF in Embodiment 2 of the present invention.

FIG. 23 is a flowchart illustrating the procedure of management information read processing using the MICF in the present embodiment. The management information read processing is executed in 1 selector unit according to the present flowchart. Before this processing is executed, the file system unit 202 looks up the file system management information of the contents management information file and retains the logical sector address (LSA_R) and data of the read object.

First, the processing performed in step S351 will be explained. The file system unit 202 notifies the cache file management unit 205 of the logical sector address (LSA_R) of the read object. The cache file management unit 205 reads the newest CAT of the MICF stored in the nonvolatile storage device 1a to the cache management table 221. Where the newest CAT is already present in the cache management table 221, the read processing may be skipped.

The processing performed in step S352 will be described below. The cache file management unit 205 looks up the CAT of the cache management table 221 and determines whether or not the logical sector address (LSA_R) of the read object has been registered. Where the logical sector address of the read object has not been registered (the case of NO), the processing of step S353 is performed and the processing is thereafter ended. Where the logical sector address of the read object has been registered (the case of YES), the processing of steps S354 and S355 is performed and the processing is thereafter ended.

The processing performed in step S353 will be described below. Where the logical sector address of the read object has not been registered, the cache file management unit 205 notifies the file system unit 202 of the absence of the read object on the MICF. The file system unit 202 directly designates the logical sector address (LSAR) of the read object and reads the data from the nonvolatile storage device 1a.

The processing performed in step S354 will be described below. Where the logical sector address of the read object has been registered, the cache file management unit 205 looks up the CAT of the cache management table 221 and acquires the entry number of the logical sector address of the read object.

Finally, the processing performed in step S355 will be described below. The cache file management unit 205 reads the cache data of the entry with the abovementioned entry number and notifies the file system unit 202 thereof.

(2.2.4. Information Stored in the Cache Management Table)

In the present embodiment, as a result of the above-described processing operations, the cache management table 221 stores at least the newest CAT relating to the MICF. As a consequence, it is not necessary to perform reading from the nonvolatile storage device 1a each time the management information is written or read, and therefore, the processing can be accelerated. For the same reason, the cache management table 221 stores the information (entry number or the like) relating to the position of the next write entry of the MICF and updates this information for each writing to the MICF.

<2.3. Operation of Access Device>

The entire operation of the access device 2a will be explained below.

Figure 24:
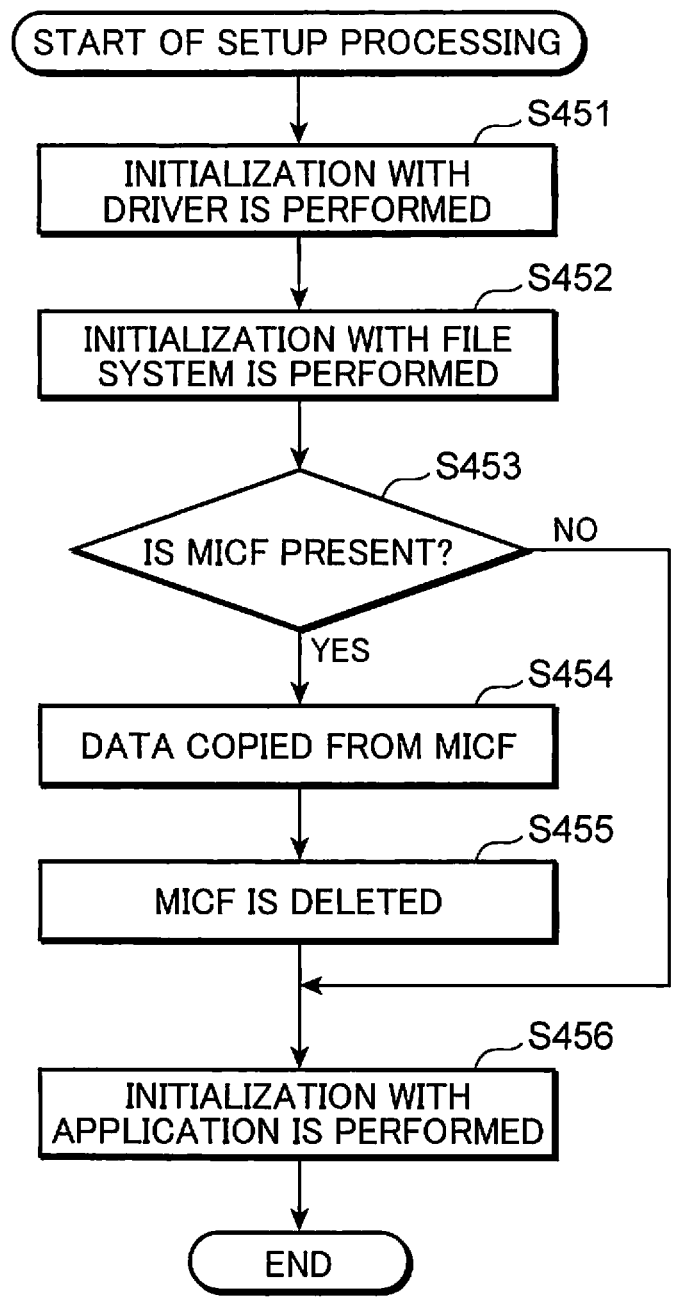
FIG. 24 is a flowchart illustrating the procedure of setup processing in Embodiment 2 of the present invention.

(2.3.1. Setup Processing)

Where the nonvolatile storage device 1a is mounted on the access device 2a, the access device 2a starts a setup processing for implementing the recording processing and reproduction processing to and from the nonvolatile storage device 1a. FIG. 24 is a flowchart illustrating a procedure of setup processing in the present embodiment.

First, the processing performed in step S451 will be explained. The nonvolatile storage device IF unit 24 of the access device 2a detects that the nonvolatile storage device 1a has been mounted and notifies the nonvolatile storage device access driver unit 203 of the detection result.

In this case, the nonvolatile storage device access driver unit 203 performs the initialization processing at a driver level with respect to the nonvolatile storage device 1a. More specifically, the nonvolatile storage device access driver unit 203 starts the supply of power source (electric power) or clock via the nonvolatile storage device IF unit 24 and issues a command to perform initialization. Further, the nonvolatile storage device access driver unit 203 acquires information relating to the nonvolatile storage device 1a (for example, storage capacity or correspondence version number) from the nonvolatile storage device 1a and notifies the file system unit 202 of this information.

The processing performed in step S452 will be explained below. The file system unit 202 reads the file system management information (master boot record, partition table, etc.) stored in the recording area provided by the nonvolatile storage device 1a and acquires on the RAM 22 the information necessary for the file system unit 202 to manage the recording area. Thus, the initialization processing at the file system level is performed.

The processing performed in step S453 will be explained below. The file system unit 202 instructs the cache file management unit 205 to perform the initialization processing. The cache file management unit 205 determines whether or not a MICF is present in the nonvolatile storage device 1a. Where the MICF is not present (the case of NO), the processing advances to step S456. Where the MICF is present (the case of YES), the processing of steps S454 and S455 is performed and the processing advances to step S456.

The processing performed in step S454 will be explained below. Where the MICF is present, the cache file management unit 205 reads the newest CAT of the MICF stored in the nonvolatile storage device 1a to the cache management table 221. The cache file management unit 205 then looks up the records registered in the CAT and where an efficient LSA has been stored, writes the cache data of the entry designated by the entry number of the record to the nonvolatile storage device 1a as the LSA data. The cache file management unit 205 performs such processing with respect to all of the records. With such a processing, the data stored in the MICF are copied to the contents management information file.

The processing performed in step S455 will be explained below. The cache file management unit 205 deletes the MICF.

Finally, the processing of step S456 will be explained. The application unit 201 reads the contents management information file stored in the nonvolatile storage device 1a via the file system unit 202 and acquires on the RAM 22 the information necessary for the application unit 201. Thus, the initialization processing at the application level is performed and the processing is thereafter completed.

When the below-described recording processing has normally ended, no MICF is present in step S453. When the power supply is cut off or the nonvolatile storage device 1a is pulled out during the recording processing, the MICF can be present.

In this case, the cache file management unit 205 verifies the presence of a MICF after the nonvolatile storage device 1a has been mounted by the above-described setup processing, and when the MICF is present, copies the update data written to the MICF to a plurality of contents management information files. As a result, the update data of the contents management information files written to the MICF can be reflected in the contents management information files, and therefore the system can recover from the abnormal state such that occurs when the power supply is cut off or the nonvolatile storage device 1a is pulled out.

(2.3.2. Recording Processing)

The application unit 201 performs the recording processing after the abovementioned setup processing. There are a variety of triggers for starting the recording processing. For example, the timing designated by the user or the timing preceding by a fixed time interval the point of time at which the recording of contents data (AV input data) has been scheduled are such triggers. The recording start or recording end of new contents data can be also performed during the recording processing.

Figure 25:
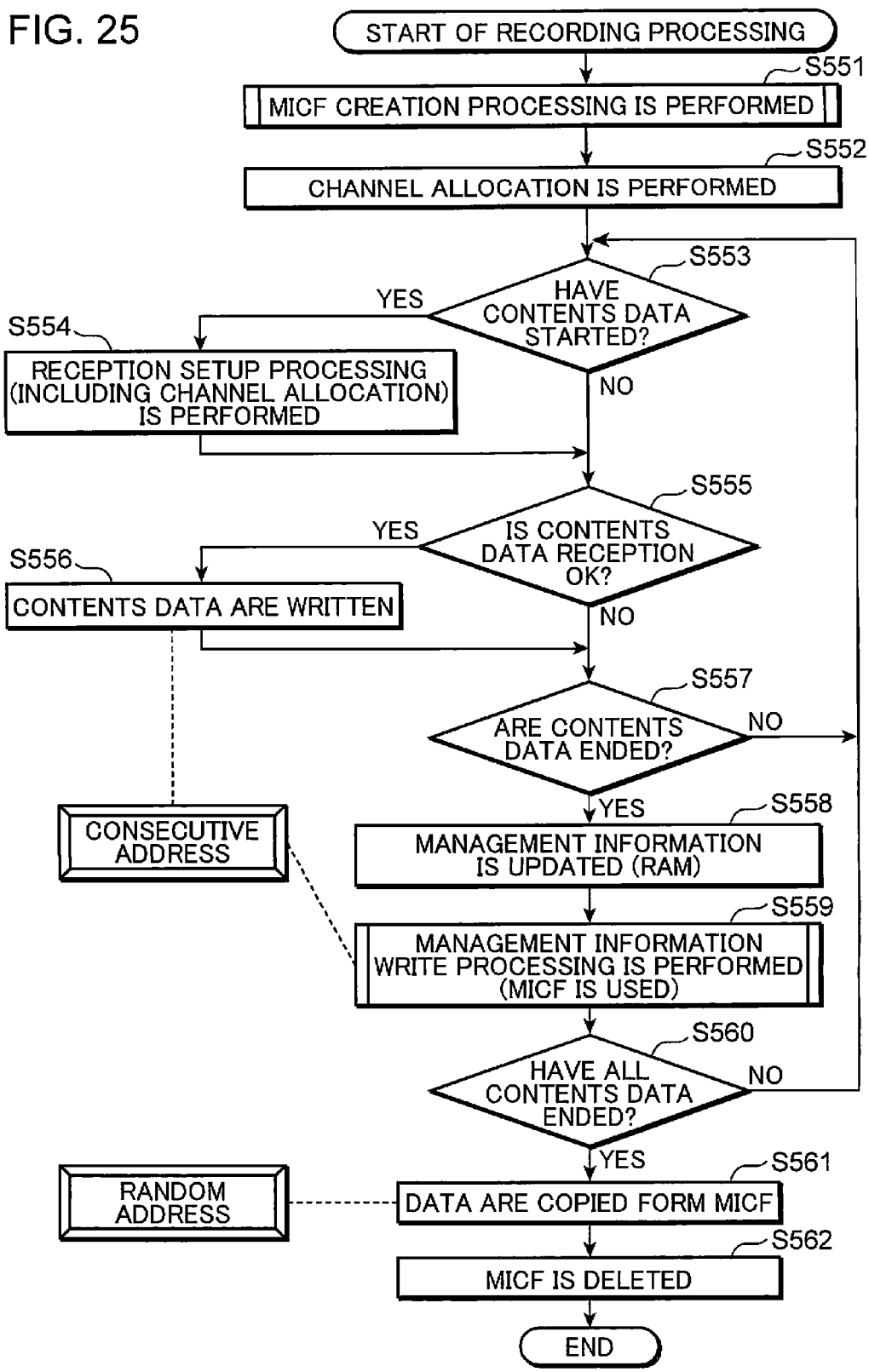
FIG. 25 is a flowchart illustrating the procedure of recording processing in Embodiment 2 of the present invention.

FIG. 25 is a flowchart illustrating a procedure of recording processing in the present embodiment. First, the processing performed in step S551 will be explained. The application unit 201 of the access device 2a instructs the cache file management unit 205 via the file system unit 202 to create a MICF anew. The cache file management unit 205 implements the MICF creation processing according to the flowchart shown in FIG. 17.

The processing performed in step S552 will be explained below. The file system unit 202 allocates a channel number for writing the MICF newly created by the cache file management unit 205 to the nonvolatile storage device 1a.

The processing performed in step S553 will be explained below. The application unit 201 determines whether or not the new contents data that should be recorded have been generated. Where the data have been generated (the case of YES), the processing makes a transition to the determination of step S555 after the processing of step S554, and where the data have not been generated (the case of NO), the processing advances to the determination of the S555.

The processing performed in step S554 will be explained below. The application unit 201 performs the setup processing for receiving the new contents data. For example, the application unit 201 ensures a buffer for temporarily storing the received contents data on the RAM 22. Further, the application unit 201 instructs the file system unit 202 to allocate a channel number for writing the contents data as a contents file to the nonvolatile storage device 1a. The application unit 201 then controls the AV input unit 25, encoding unit 26, or encrypting unit 27 and starts the processing of storing the contents file data in the buffer on the RAM 22.

The processing performed in step S555 will be explained below. The application unit 201 determines whether or not the predetermined amount of contents data have been stored in the buffer on the RAM 22, thereby determining whether or not the reception of contents data has been completed. Where the predetermined amount of contents data has been stored (the case of YES), the processing advances to the determination of step S557 after the processing of step S556. Otherwise (the case of NO), the processing advances to the determination of step S557.

The processing performed in step S556 will be explained below. The access device 2a writes the contents file data stored in the buffer on the RAM 22 to the nonvolatile storage device 1a. The writing is performed with respect to consecutive addresses with designation of channel numbers allocated in step S554. Since the contents file can be written to the nonvolatile storage device 1a with consecutive addresses, the degradation of write performance is prevented even when the writing is performed in parallel with other contents file data of MICF data.

The processing performed in step S557 will be explained below. The application unit 201 determines whether or not the contents data that are being recorded have ended. Where the data have ended (the case of YES), the processing advances to step S558, and where the data have not ended (the case of NO), the processing advances to the determination of step S553.

The processing performed in step S558 will be explained below. The application unit 201 creates new data of the contents management information files on the RAM 22 with respect to the contents data for which the recording has ended.

The processing performed in step S559 will be explained below. The application unit 201 writes the new data of the contents management information files to the MICF according to the flowchart shown in FIG. 19 via the file system unit 202 and the cache file management unit 205. The writing is implemented by the writing procedure explained with reference to FIG. 19, with the designation of channel numbers allocated in step S552. As a result, the new data of the contents management information files can be written to the MICF at consecutive addresses, thereby preventing the degradation of write performance even when the writing is performed in parallel with other contents file data.

The processing performed in step S560 will be explained below. The application unit 201 determines whether all of the contents data that are being recorded have ended. Where all of the contents data have ended (the case of YES), the processing advances to step S561, and where all of the contents data have not ended (the case of NO), the processing advances to the determination of step S553.

The processing performed in step S561 will be explained below. Where all of the contents data have ended, the cache file management unit 205 reads the newest CAT of the MICF stored in the nonvolatile storage device 1a to the cache management table 221 according to the instruction from the application unit 201. Where the newest CAT is already present in the cache management table 221, the read processing may be skipped.

Then, the cache file management unit 205 looks up the records registered in the CAT of the cache management table 221, and if a valid LSA has been stored, writes the cache data of the entry designated by the entry number of this record as the LSA data to the nonvolatile storage device 1a. The writing is implemented with respect to all of the records, with designation of channel numbers allocated in step S552.

With the present processing, the data stored in the MICF are copied to the contents management information files. In the present processing, the writing performance decreases because writing to random logical addresses is generated, but since the recording of all of the cotenants data has already ended, the present processing produces no effect on real time recording.

Finally, the processing performed in step S562 will be explained. The 205 deletes the MICF, and the application unit 201 ends the recording processing.

(2.4. Conclusion)

As described hereinabove, in the nonvolatile storage system 1001, when the access device 2a performs real time recording of a plurality of contents data in the nonvolatile storage device 1a by time division multiplexing, the update data of all of the contents management information files are written to the MICF. After the real time recording of all of the contents data has ended, the contents stored in the MICF is reflected in contents management information files and the MICF is deleted.

As a result, in the present embodiment, it is not necessary to allocate a channel number to each of the contents management information files. Therefore, it is possible to provide the nonvolatile storage device 1a, access device 2a, and nonvolatile storage system 1001 in which the contents file and the plurality of contents management information files can be written in parallel without degrading the writing performance, while inhibiting the increase in the channel number used.

The numerical values described in the abovementioned embodiment are exemplary and other values may be used. For example, the values such as entry size are all exemplary and not limited to the values described in the embodiment. Further, the following variations are possible.

(1) In the above-described embodiments, the data format such as shown in FIG. 16 is used and one cache data can be stored in each entry. However, a plurality of cache data may be also stored in each entry.

Figure 26:
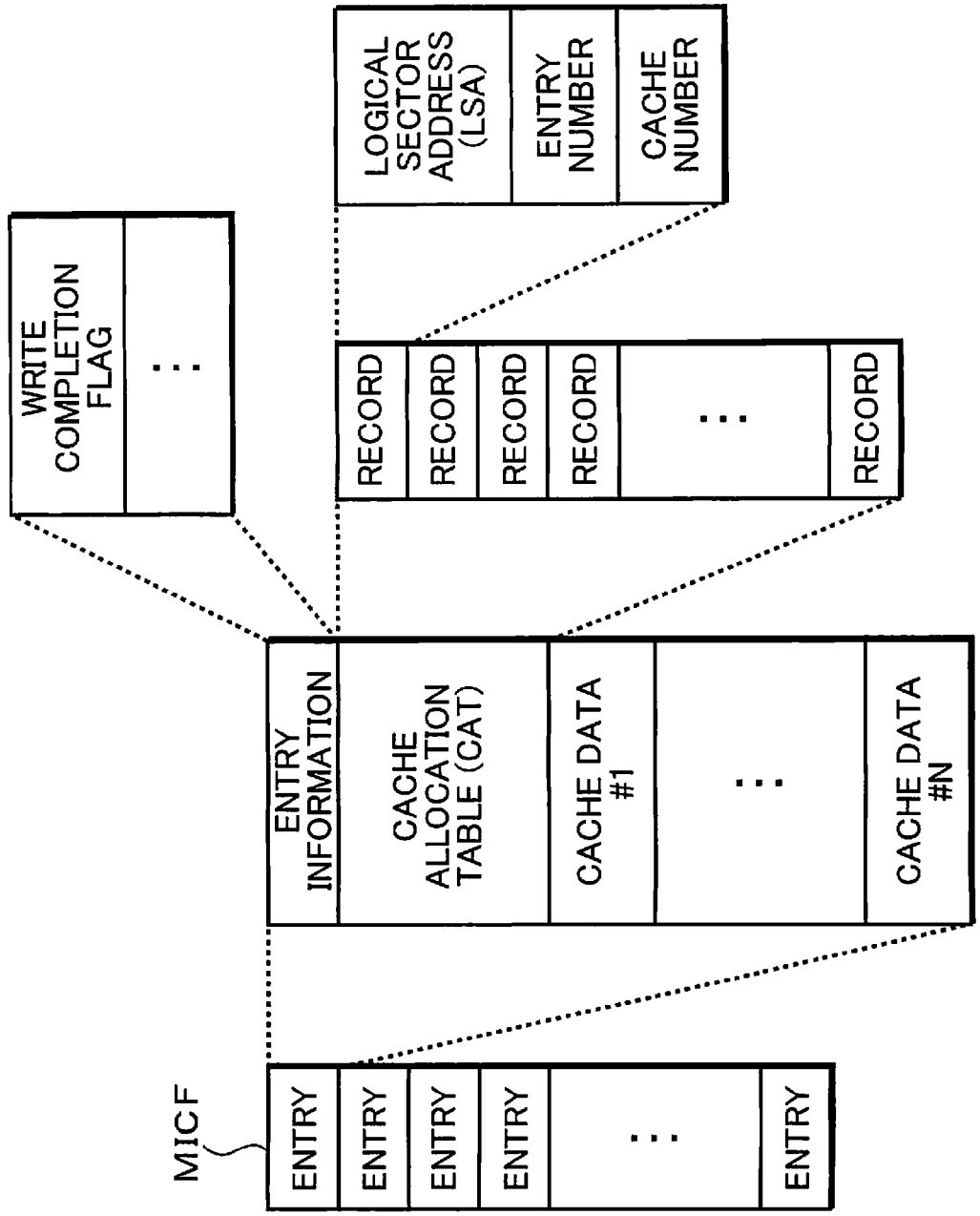
FIG. 26 illustrates an example of MICF data format in Variation Example 1 of Embodiment 2 of the present invention.

For example, a data format such as shown in FIG. 26 may be also used. In the format shown in FIG. 26, a plurality of cache data (N with the number of #1 to #N) can be stored with respect to one entry, and a cache number (any from #1 to #N) is added, in addition to the entry number, to each record of the CAT in order to specify the position of each cache data with respect to the LSA. As a result, a plurality of update data corresponding to different LSA can be written to one entry.

As a result, the update data of a plurality of contents information management files can be written by one entry writing operation, and therefore the MICF writing efficiency can be increased by implementing the nonvolatile storage system 1001. Further, such an approach is also effective when the update of a plurality of contents management information files is wished to be validated or invalidated with respect to all of the files.

Figure 27:
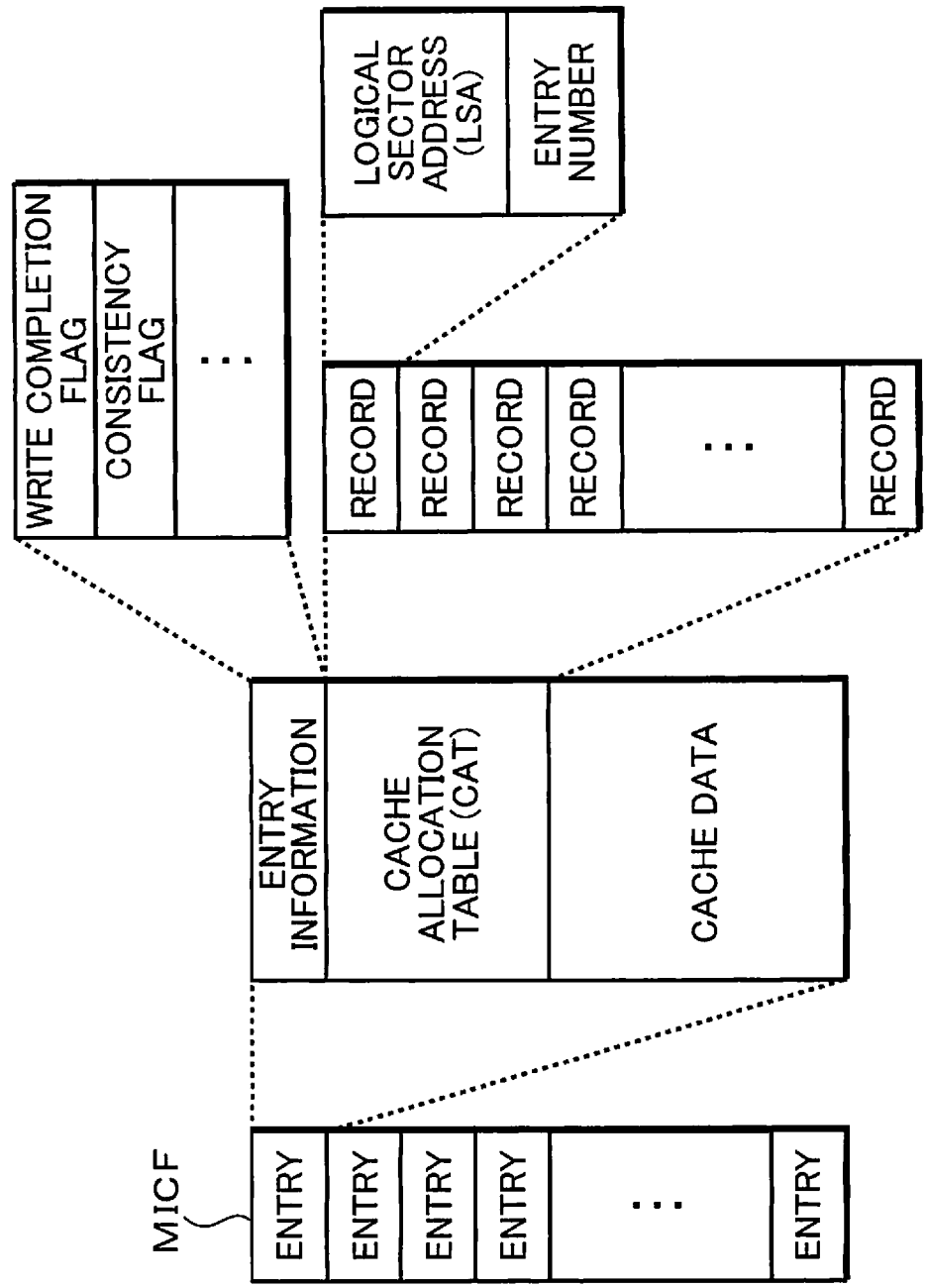
FIG. 27 illustrates an example of MICF data format in Variation Example 2 of Embodiment 2 of the present invention.

(2) In the above-described embodiments, the data format such as shown in FIG. 16 is used and a write completion flag is stored as entry information. However, a "CONSISTENCY FLAG" can be also stored as entry information in the very last entry in the series of entry writing operations, this flag serving to validate together the entries that have been stored in the address preceding that of the aforementioned very last entry, as shown in FIG. 27.

In this case, in the recording processing shown in FIG. 25, when a plurality of entries are written to the MICF in step S559, only the very last entry writing operation in the series of entry writing operations is performed with the "CONSISTENCY FLAG" being ON, and all other entries are written with the flag being OFF.

In the setup processing shown in FIG. 24, in the processing of step S454, the cache file management unit 205 is assumed to read the CAT of the rearmost entry, from among the entries for which both the "WRITE COMPLETION FLAG" and the "CONSISTENCY FLAG" are ON, as the newest CAT of the MICF. For example, where the MICF is in the state shown in FIG. 28, the CAT of the seventh entry is read, and when the MICF is in the state shown in FIG. 29, the CAT of the second entry is read.

As described above, by using the consistency flag, it is possible to obtain a state in which the entire update of the plurality of contents management information files is validated or invalidated.

Figure 30:
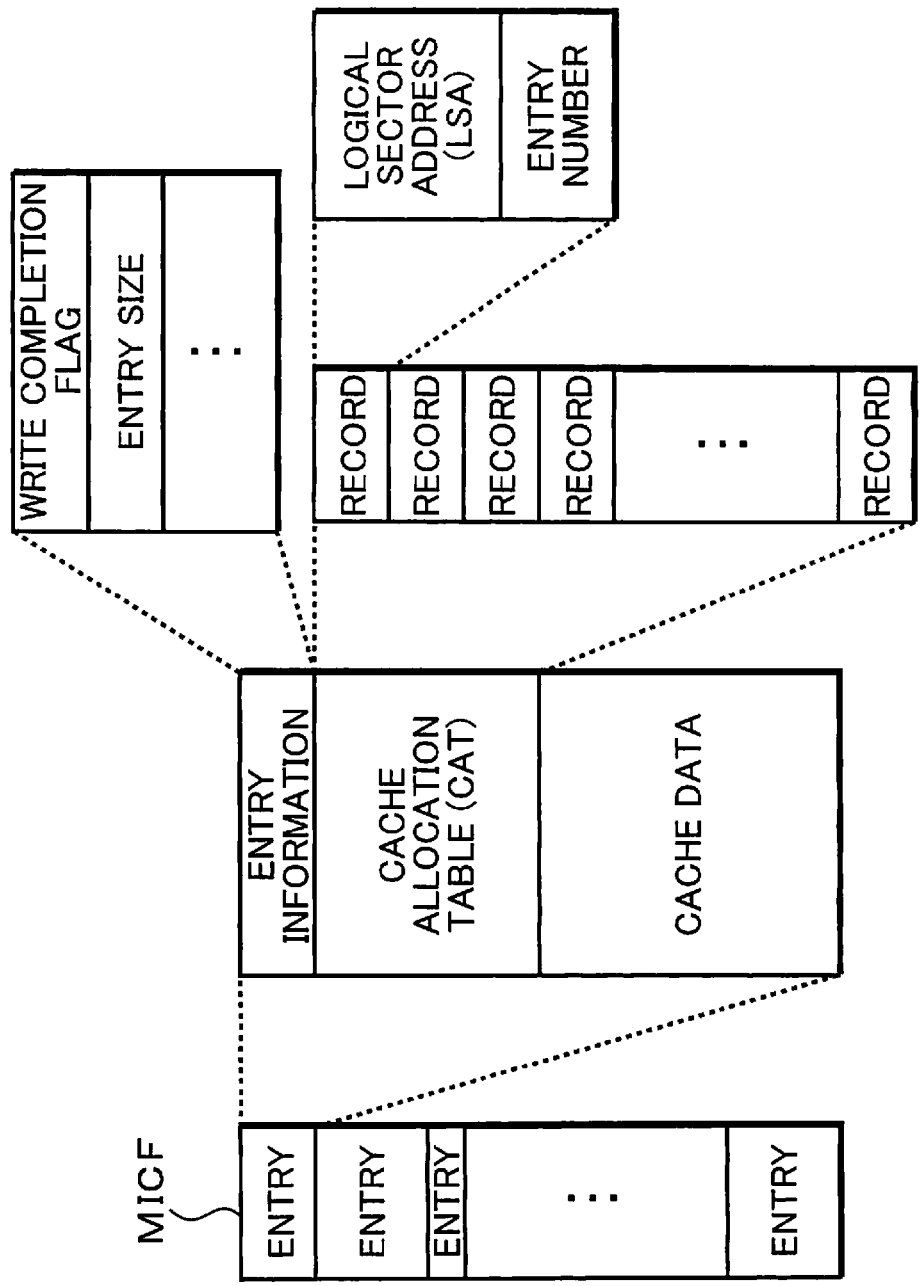
FIG. 30 illustrates an example of MICF data format in Variation Example 3 of Embodiment 2 of the present invention.

(3) In the above-described embodiments, the data format such as shown in FIG. 16 is used and each entry has a fixed length, but each entry may have a variable length as shown in FIG. 30. In this case, a start position of each entry can be retrieved by storing the size of the entry in the entry information. Further, with a fixed length, the retrieval is facilitated, and with a variable length, the area in the entry can be used more efficiently. Therefore, it is preferred that a fixed length or variable length be selected according to the requirements relating to the nonvolatile storage device 1a.

(4) In the above-described embodiments, the MICF is managed by the cache file management unit 205 included in the file system unit 202, but the cache file management unit 205 may be also included in the application unit 201.

Figure 31:
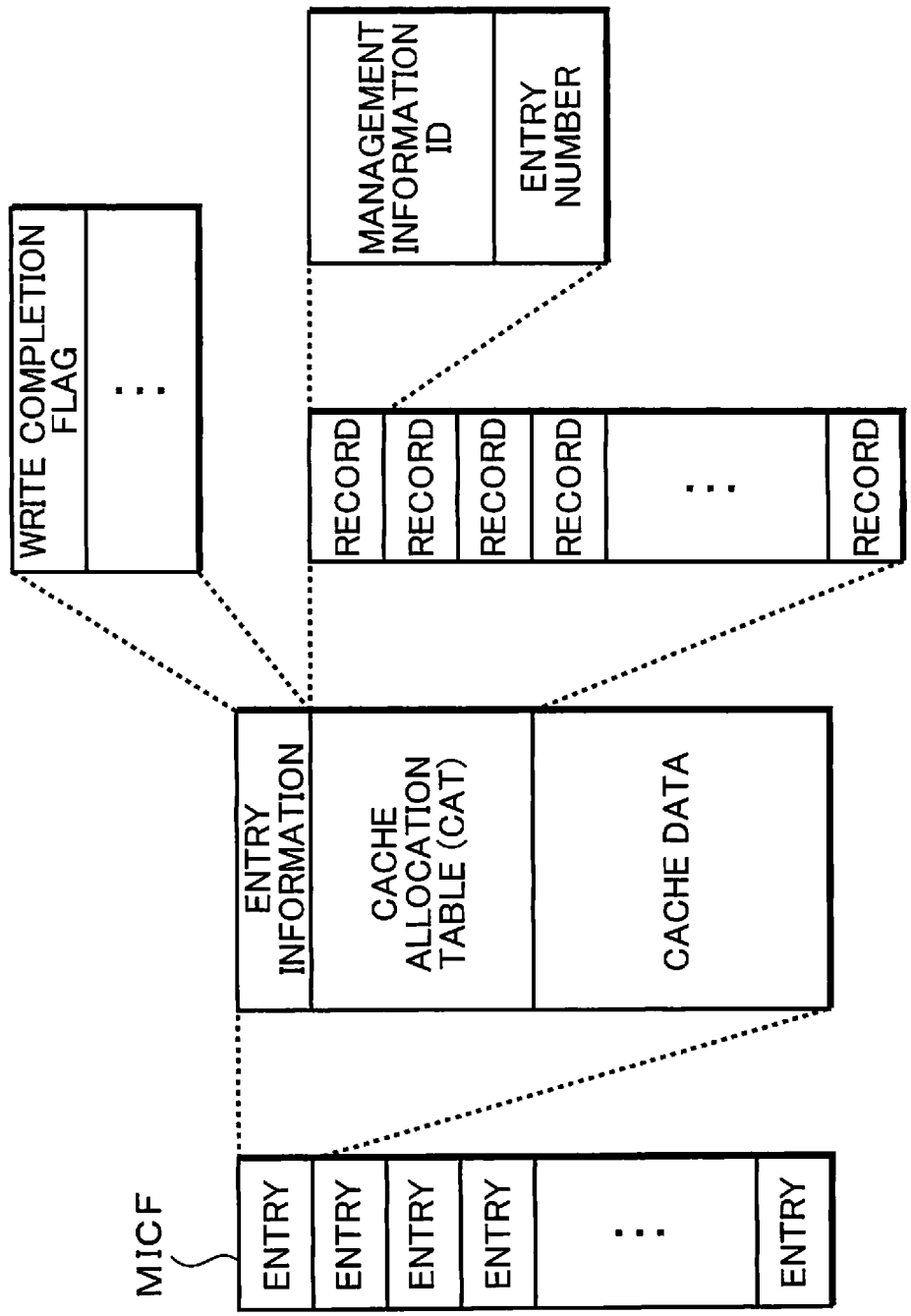
FIG. 31 illustrates an example of MICF data format in Variation Example 4 of Embodiment 2 of the present invention.

In this case, a CAT record is constituted by "ID (identification information) identifying management information included in each management information file (MANAGEMENT INFORMATION ID)" and "ENTRY NUMBER" as shown in FIG. 31, rather that by a second of "LSA" and "ENTRY NUMBER" such as shown in FIG. 16. Further, management information data corresponding to the "MANAGEMENT INFORMATION ID" is stored in the cache data region of each entry. Such a configuration can be expected to demonstrate the same effect as the abovementioned embodiments.

(5) In the above-described embodiments, the timing for implementing the management information write processing by using a MICF in the recording processing is taken as a timing at which the recording of contents data has ended, but such a selection is not limiting.

For example, provisional management information write processing of contents data that are being recorded may be implemented. As a result, the number of management information write processing operations is increased, but when the power supply is cut off or the nonvolatile storage device 1a is pulled out, the access device 2a can verify the contents data that are being recorded.

Other Embodiments

The present invention is explained with reference to the abovementioned embodiments, but the present invention is not limited to the abovementioned embodiments. Thus, changes can be made without departing from the scope of the present invention. The below-described changes can be also made.

(1) Functional blocks in the access device, nonvolatile storage device, controller, and nonvolatile storage system in the abovementioned embodiments may be implemented individually on one chip by a semiconductor device such as LSI, or some or all of the aforementioned devices may be implemented on one chip.

The term "ISI" is used hereinabove, but the integrated configuration can be referred to as IC (Integrated Circuit), system LSI, super LSI, and ultra LSI, depending on the degree of integration.

Further, the method of circuit integration is not limited to LSI and may involve special circuits or general-use processors. A FPGA (Field Programmable Gate Array) that can be programmed after the LSI has been manufactured, or a reconfigurable processor in which the connections or settings of circuit cells inside LSI can be reconfigured may be also used.

Furthermore, if a circuit integration technique emerges that is capable of replacing LSI as a result of advances in or derivation from the semiconductor technology, the functional block may obviously be integrated by using this technique. For example, biotechnology can be applied.

(2) The processing operations in the abovementioned embodiments may be implemented by hardware or software (including the case of realization together with an OS (operation system), a middleware, or a predetermined library). Further, the realization by combined processing by software and hardware is also possible. It goes without saying that when the access device, nonvolatile storage device, and nonvolatile storage system of the abovementioned embodiments are realized by hardware, timing adjustment for performing each processing is required. In the abovementioned embodiments, details relating to timing adjustment of signals occurring in the actual hardware design are omitted for the sake of convenience of explanation.

The sequence of executing the processing method in the abovementioned embodiments is not necessarily limited to that described in the embodiments and can be changed without departing from the scope of the invention.

(3) The nonvolatile storage device in the above-described embodiments is described as a removable storage device such as a semiconductor memory card, but the nonvolatile storage device may be also realized as an information storage module of a format such that can be incorporated in a substrate of an access device.

Summarizing the features of the above-described embodiments, the present invention can be found to have the following configuration. Thus, the nonvolatile storage device in accordance with the present invention can communicate with an access device and performs reading and/or writing of data on the basis of an instruction from the access device, and the nonvolatile storage device includes: a nonvolatile memory that stores data; and a memory controller that controls the nonvolatile memory, wherein the memory controller accepts a pause instruction to pause writing from the access device within the period in which data from the access device are written and writes the data received from the access device to the nonvolatile memory within a predetermined time interval, then pauses the writing and accepts read and/or write of new data from the access device.

In this nonvolatile storage device, a pause instruction to pause writing from the access device is accepted within the period in which data are written from the access device, the data received from the access device are written to the nonvolatile memory within a predetermined time interval, and then the writing is paused and read and/or write of new data is accepted. Therefore, a plurality of data, for example, a contents file and a plurality of contents management information files, can be written in parallel so as to cause no degradation of writing performance, while inhibiting the increase in the channel number used.

It is preferred that the memory controller include a pause control unit that secures part of the nonvolatile memory as a save area and deletes in advance a physical block constituting the save area before the writing is performed when a write instruction for writing the data from the access device is accepted, and a command processing unit that writes write data to part of the nonvolatile memory other than the save area when the pause instruction is not accepted within the period in which data from the access device are written, and upon accepting the pause instruction within the period in which data from the access device are written, the pause control unit write the write data to the save area.

In this case, where a write instruction to perform writing of data from the access device is accepted, part of the nonvolatile memory is ensured as a save area and a physical block constituting the save area is deleted in advance before the writing is performed. As a result, part of the nonvolatile memory can be ensured as a save area. Therefore, when a pause instruction is not accepted within the period in which data writing is performed from the access device, write data can be written to part of the nonvolatile memory other than the save area, and when a pause instruction is accepted within the period in which data writing is performed from the access device, the write data can be written to the save area. As a consequence, in the case in which comparatively long processing time is required, for example, when the immediately preceding write instruction corresponds to a random address, the write instruction can be temporarily paused and the unwritten data can be temporarily stored in the save area.

It is preferred that upon accepting a recovery instruction to recover from a pause by the instruction from the access device after the pause instruction has been accepted within the period in which data from the access device are written and thereby writing has been paused, the pause control unit read data written to the save area and copy the data to part of the nonvolatile memory other than the save area.

In this case, where a recovery instruction to recover from a pause by the instruction from the access device is accepted after the pause instruction has been accepted within the period in which writing of data is performed from the access device and writing has been paused, the data written to the save area are read and copied to part of the nonvolatile memory other than the save area. Therefore, even when a plurality of contents management information files are written to random addresses, the writing of the contents file and the writing of the contents management information files can be performed in parallel by time division multiplexing within the predetermined access time range.

It is preferred that the pause control unit output, to the access device, information to be used by the access device to determine whether or not the pause instruction has been accepted within the period in which data from the access device are written and whereby the writing has been paused.

In this case, information to be used by the access device to determine whether or not the pause instruction has been accepted within the period in which data writing is performed from the access device and the writing has been paused is outputted to the access device. Therefore, the access device can restart, on the basis of this information, the processing that has been temporarily paused.

The access device in accordance with the present invention is an access device performing writing of a plurality of contents data to a nonvolatile storage device, wherein each of the plurality of contents data is divided into a contents file that stores contents and a plurality of contents management information files that store related information added to the contents, and is stored in thus divided form in the nonvolatile storage device, and the access device includes: an allocation unit that allocates access time intervals to the nonvolatile storage device in predetermined unit time intervals for each contents data when the plurality of contents data are written to the nonvolatile storage device by time division multiplexing; and a write unit that performs writing of the contents file and writing of the plurality of contents management information files within a range of the access time interval.

In such access device, each of the plurality of contents data are divided into a contents file that stores contents and a plurality of contents management information files that store related information added to the contents and is stored in the nonvolatile storage device, and when such contents data are written to the nonvolatile storage device in parallel by time division multiplexing, the access time to the nonvolatile storage device is allocated in predetermined unit time intervals to each contents data and the writing of the contents file and the writing of the contents management information files is performed within the access time range. Therefore, the contents file and the plurality of contents management information files can be written in parallel so as to prevent the degradation of write performance, while inhibiting the increase in the channel numbers used.

The write unit preferably writes the plurality of contents management information files after writing the contents file.

In this case, since writing of the plurality of contents management information files is performed after writing the contents file, the plurality of contents management information files can be written by using the access time allocated for writing the contents file. As a result, even when the plurality of contents management information files are written to the random addresses, the contents file and the contents management information files can be written in parallel by time division multiplexing within the predetermined access time range.

The allocation unit preferably issues a pause instruction to the nonvolatile storage device to pause the writing within the period in which the nonvolatile storage device performs data writing.

In this case, the pause instruction to pause the writing within the period in which the nonvolatile storage device performs data writing can be performed in the nonvolatile storage device. Therefore, the write instruction can be temporarily paused when a comparatively long processing time is required, for example, when the immediately preceding write instruction corresponds to a random address.

The allocation unit preferably allocates the access time to each contents data so that the access time increases as the recording rate of the contents data increases.

In this case, the access time is allocated to each contents data so that the access time increases with the increase in the recording rate of the contents data. Therefore, a plurality of contents data can be recorded in parallel and rapidly according to the recording rate of each contents data.

The allocation unit preferably resets the access time each time the recording of contents data is started and/or ended.

In this case, since the access time is reset each time the recording of contents data is started and/or ended, an adequate access time can be set according to the number of contents data that should be recorded and the plurality of contents data can be recorded in parallel and rapidly.

The nonvolatile storage system in accordance with the present invention includes the aforementioned nonvolatile storage device and the aforementioned access device.

The access device in accordance with the present invention performs writing of a plurality of contents data to a nonvolatile storage device, wherein each of the plurality of contents data is divided into a contents file that stores contents and a plurality of contents management information files that store related information added to the contents, and is stored in thus divided form in the nonvolatile storage device, and wherein the access device includes: a write unit that writes the contents file to the nonvolatile storage device, and a management unit that writes additionally update information of the plurality of contents management information files successively from the beginning of the management information cache files in accordance with entry unit, which is a predetermined write unit, within a period in which writing of the contents file is continued, and the management unit copies the update information, which is written to the management information cache file, to be reflected in the plurality of contents management information files after the writing of the contents file has ended.

In such access device, within a period in which writing of the contents file storing the contents is continued, update information of the plurality of contents management information files that store related information added to the contents is written successively and additionally from a head of the management information cache files in an entry unit, which is a predetermined write unit, and after the writing of the contents file has ended, the update information written to the management information cache file is copied and reflected in the plurality of contents management information files. Therefore, the contents file and the plurality of contents management information files can be written in parallel so as to prevent the degradation of write performance, while inhibiting the increase in the channel numbers used.

The management unit preferably copies the update information written in the management information cache file to the plurality of contents management information files and then deletes the management information cache file.

In this case, the update information written in the management information cache file is copied to the plurality of contents management information files, and the management information cache file is then deleted. Therefore, data that are newer than the original contents management information files, or the same data can be stored at all times in the management information cache file.

The management unit preferably secures, before the start of writing the contents file, a fixed area and a consecutive address space as an area in which the file data of the management information cache file is to be written.

In this case, a fixed area and a consecutive address space are ensured as an area in which the file data of the management information cache file will be written before the write start of the contents file. Therefore, the update information of the plurality of contents management information files can be rapidly written into the management information cache file.

The management unit preferably writes to the entry a cache allocation table, which is a table for retrieving address information of each update information stored in the management information cache file, together with the update information.

In this case, since the cache allocation table is written together with the update information to the entry, the address information of each update information stored in the management information cache file can be easily retrieved.

The management unit preferably writes a logical address of the update information to the cache allocation table.

In this case, since a logical address of the update information is written to the cache allocation table, the address information of each update information stored in the management information cache file can be retrieved more rapidly.

The management unit preferably writes a management information ID, which is an identifier of the update information, to the cache allocation table.

In this case, since a management information ID, which is an identifier of the update information, is written to the cache allocation table, it is possible to configure the management unit in the application unit that controls the entire access device, for example, controls the generation of data and the power source.

The management unit preferably writes to the entry a write completion flag, which is a flag for determining whether or not data have been written to the entry.

In this case, since a write completion flag is written to the entry, it is possible to determine easily whether or not data have been written to the entry.

The management unit preferably writes to the entry a consistency flag for validating in a lump the entries stored in an address preceding the aforementioned entry.

In this case, since a consistency flag for validating together the entries stored in the address preceding the aforementioned entry is written to the entry, it is possible to obtain a state in which the entire update of a plurality of contents management information files is validated or invalidated.

The management unit preferably writes to the entry a plurality of update information corresponding to different logical sector addresses.

In this case, since a plurality of update information corresponding to different logical sector addresses are written to the entry, update data of a plurality of contents management information files can be implemented by one entry writing, writing efficiency of the management information cache file can be increased, and the entire update of the plurality of contents management information files can be validated or invalidated.

It is preferred that the management unit verify whether or not the management information cache file is present after the nonvolatile storage device has been mounted, and when the management information cache file is present, copy the update information written to the management information cache file to the plurality of contents management information files.

In this case, whether or not the management information cache file is present is verified after the nonvolatile storage device has been mounted, and when the management information cache file is present, the update information written to the management information cache file is copied to the plurality of contents management information files. Therefore, update data of the contents management information files written to the management information cache file can be reflected in the contents management information files and therefore the system can recover from the abnormal state such that occurs when the power supply is cut off or the nonvolatile storage device is pulled out.

The nonvolatile storage device according to another aspect of the present invention can communicate with an access device and performs reading and/or writing of data on the basis of an instruction from the access device, the nonvolatile storage device including: a nonvolatile memory that stores data; and a memory controller that controls the nonvolatile memory, wherein each of a plurality of contents data that are written to the nonvolatile memory is divided into a contents file that stores contents and a plurality of contents management information files that store related information added to the contents, and is stored in thus divided form in the nonvolatile memory; the nonvolatile memory has a management information cache file that writes temporarily update information of the plurality of contents management information files; the management information cache file is constituted by a set of entries which are write units of the update information, and each of the entries includes the update information together with a cache allocation table, which is a table for retrieving address information of each update information stored in the management information cache file.

This nonvolatile storage device has a management information cache file that writes temporarily update information of the plurality of contents management information files that store related information added to the contents, the management information cache file is constituted by a set of entries which are write units of the update information, and the entry includes the update information together with a cache allocation table which is a table for retrieving address information of each update information stored in the management information cache file. Therefore, within a period in which writing of the contents file storing the contents is continued, update information of the plurality of contents management information files is written successively and additionally from a head of the management information cache files in the entry unit, and after the writing of the contents file has ended, the update information written to the management information cache file is copied and reflected in the plurality of contents management information files. As a result, the contents file and the plurality of contents management information files can be written in parallel so as to prevent the degradation of write performance, while inhibiting the increase in the channel numbers used.

The nonvolatile storage system according to another aspect of the present invention includes the aforementioned nonvolatile storage device and the aforementioned access device.

The nonvolatile storage system, access device, and nonvolatile storage device in accordance with the present invention can efficiently perform updating of a plurality of contents management information files during real time recording of the contents file. This feature is optimum (useful) not only for semiconductor memory cards but also for PC applications, audio recorders, DVD recorders, HDD recorders, camcorders, digital still cameras, and portable cellular terminals, which are access devices using semiconductor storage devices such as semiconductor memory cards and handling digital contents such as dynamic images, music, and static images, and can be implemented in fields relating to a semiconductor memory.

This application is based on Japanese Patent Application No. 2010-043920 filed on Mar. 1, 2010, and Japanese Patent Application No. 2010-055736 filed on Mar. 12, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A nonvolatile storage device that can communicate with an access device and performs reading and/or writing of data on the basis of an instruction from the access device,
the nonvolatile storage device comprising:
a nonvolatile memory that stores data; and
a memory controller that controls the nonvolatile memory, wherein
the memory controller accepts a pause instruction to pause writing from the access device within a period in which data from the access device are written, and writes the data received from the access device to the nonvolatile memory within a predetermined time interval, then pauses the writing and accepts read and/or write of new data from the access device,
wherein the memory controller comprises:
a pause control unit that secures part of the nonvolatile memory as a save area and deletes in advance a physical block constituting the save area before the writing is performed when a write instruction for writing the data from the access device is accepted, and
a command processing unit that writes write data to part of the nonvolatile memory other than the save area when the pause instruction is not accepted within the period in which data from the access device are written, and wherein
upon accepting the pause instruction within the period in which data from the access device are written, the pause control unit writes write data to the save area.

2. The nonvolatile storage device according to claim 1, wherein
upon accepting a recovery instruction to recover from a pause by the instruction from the access device after the pause instruction has been accepted within the period in which data from the access device are written and thereby writing has been paused, the pause control unit reads data written to the save area and copies the data to part of the nonvolatile memory other than the save area.

3. The nonvolatile storage device according to claim 1, wherein
the pause control unit outputs, to the access device, information to be used by the access device to determine whether or not the pause instruction has been accepted within the period in which data from the access device are written and whereby the writing has been paused.

4. An access device performing writing of a plurality of contents data to a nonvolatile storage device, wherein
each of the plurality of contents data is divided into a contents file that stores contents and a plurality of contents management information files that store related information added to the contents, and is stored in thus divided form in the nonvolatile storage device, and
the access device comprises:
an allocation unit that allocates access time allowed for writing each contents data for each of a plurality of channels when the plurality of contents data are written to the nonvolatile storage device by time division multiplexing by using the plurality of channels; and
a write unit that performs writing of the contents file and writing of the plurality of contents management information files, while switching the contents data for each access time.

5. The access device according to claim 4, wherein the write unit writes the plurality of contents management information files after writing the contents file.

6. The access device according to claim 4, wherein the allocation unit issues a pause instruction to the nonvolatile storage device to pause the writing within the period in which the nonvolatile storage device performs data writing.

7. The access device according to claim 4, wherein the allocation unit allocates the access time to each contents data so that the access time increases as a recording rate of the contents data increases.

8. The access device according to claim 4, wherein the allocation unit resets the access time each time the recording of contents data is started and/or ended.

9. A nonvolatile storage system comprising:
an access device; and
a nonvolatile storage device that can communicate with the access device and performs reading and/or writing of data on the basis of an instruction from the access device,
the nonvolatile storage device comprising:
a nonvolatile memory that stores data; and
a memory controller that controls the nonvolatile memory, wherein
the memory controller accepts a pause instruction to pause writing from the access device within a period in which data from the access device are written, and writes the data received from the access device to the nonvolatile memory within a predetermined time interval, then pauses the writing and accepts read and/or write of new data from the access device;
wherein
the access device performs writing of a plurality of contents data to the nonvolatile storage device,
each of the plurality of contents data is divided into a contents file that stores contents and a plurality of contents management information files that store related information added to the contents, and is stored in thus divided form in the nonvolatile storage device, and the access device comprises:
an allocation unit that allocates access time intervals to the nonvolatile storage device in predetermined unit time intervals for each contents data when the plurality of contents data are written to the nonvolatile storage device by time division multiplexing; and
a write unit that performs writing of the contents file and writing of the plurality of contents management information files within a range of the access time interval.

10. An access device performing writing of a plurality of contents data to a nonvolatile storage device, wherein
each of the plurality of contents data is divided into a contents file that stores contents and a plurality of contents management information files that store related information added to the contents, and is stored in thus divided form in the nonvolatile storage device, and
the nonvolatile memory has a management information cache file that temporarily writes update information of the plurality of contents management information files, wherein
the access device comprises:
a write unit that writes the contents file to the nonvolatile storage device, and
a management unit that additionally writes update information of the plurality of contents management information files successively from the beginning of the management information cache files in accordance with an entry unit, which is a predetermined write unit, within a period in which writing of the contents file is continued, and
the management unit copies the update information, which is written to the management information cache file, to be reflected in the plurality of contents management information files after the writing of the contents file has ended.

11. The access device according to claim 10, wherein the management unit copies the update information written in the management information cache file to the plurality of contents management information files and then deletes the management information cache file.

12. The access device according to claim 10, wherein the management unit secures, before the start of writing the contents file, a fixed area and a consecutive address space as an area in which the file data of the management information cache file is to be written.

13. The access device according to claim 10, wherein the management unit writes to the entry a cache allocation table, which is a table for retrieving address information of each update information stored in the management information cache file, together with the update information.

14. The access device according to claim 10, wherein the management unit writes to the entry a write completion flag, which is a flag for determining whether or not data have been written to the entry.

15. The access device according to claim 10, wherein the management unit writes to the entry a consistency flag for validating in a lump the entries stored in an address preceding the entry.

16. The access device according to claim 10, wherein the management unit writes to the entry a plurality of update information corresponding to different logical sector addresses.

17. The access device according to claim 11, wherein the management unit verifies whether or not the management information cache file is present after the nonvolatile storage device has been mounted, and when the management information cache file is present, copies the update information written to the management information cache file to the plurality of contents management information files.

18. A nonvolatile storage device that can communicate with an access device and performs reading and/or writing of data on the basis of an instruction from the access device,
the nonvolatile storage device comprising:
a nonvolatile memory that stores data; and
a memory controller that controls the nonvolatile memory, wherein
each of a plurality of contents data that are written to the nonvolatile memory is divided into a contents file that stores contents and a plurality of contents management information files that store related information added to the contents, and is stored in thus divided form in the nonvolatile memory;
the nonvolatile memory has a management information cache file that temporarily writes update information of the plurality of contents management information files;
the management information cache file is constituted by a set of entries which are write units of the update information, and
each of the entries includes the update information together with a cache allocation table, which is a table for retrieving address information of each update information stored in the management information cache file.

19. A nonvolatile storage system comprising:
an access device; and
a nonvolatile storage device that can communicate with the access device and performs reading and/or writing of data on the basis of an instruction from the access device,
the nonvolatile storage device comprising:
a nonvolatile memory that stores data; and
a memory controller that controls the nonvolatile memory, wherein
each of a plurality of contents data that are written to the nonvolatile memory is divided into a contents file that stores contents and a plurality of contents management information files that store related information added to the contents, and is stored in thus divided form in the nonvolatile memory;
the nonvolatile memory has a management information cache file that temporarily writes update information of the plurality of contents management information files;
the management information cache file is constituted by a set of entries which are write units of the update information, and
each of the entries includes the update information together with a cache allocation table, which is a table for retrieving address information of each update information stored in the management information cache file;
wherein
the access device performs writing of a plurality of contents data to the nonvolatile storage device,
each of the plurality of contents data is divided into a contents file that stores contents and a plurality of contents management information files that store related information added to the contents, and is stored in thus divided form in the nonvolatile storage device, and
the access device comprises:
a write unit that writes the contents file to the nonvolatile storage device, and
a management unit that additionally writes update information of the plurality of contents management information files successively from the beginning of the management information cache files in accordance with an entry unit, which is a predetermined write unit, within a period in which writing of the contents file is continued, and the management unit copies the update information, which is written to the management information cache file, to be reflected in the plurality of contents management information files after the writing of the contents file has ended.

\* \* \* \* \*